(12) United States Patent
Wilt

(10) Patent No.: US 10,600,144 B2
(45) Date of Patent: *Mar. 24, 2020

(54) DISAGGREGATED GRAPHICS ASSET MANAGEMENT FOR VIRTUALIZED GRAPHICS

(71) Applicant: Amazon Technologies, Inc., Seattle, WA (US)

(72) Inventor: Nicholas Patrick Wilt, Mercer Island, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/246,115

(22) Filed: Jan. 11, 2019

(65) Prior Publication Data

US 2019/0147562 A1    May 16, 2019

Related U.S. Application Data

(63) Continuation of application No. 15/177,262, filed on Jun. 8, 2016, now Pat. No. 10,181,173.

(51) Int. Cl.
*G06T 1/20*      (2006.01)
*G06T 1/60*      (2006.01)
(Continued)

(52) U.S. Cl.
CPC ............ *G06T 1/20* (2013.01); *G06F 9/45558* (2013.01); *G06F 9/5077* (2013.01); *G06T 1/60* (2013.01); *G06F 2009/45595* (2013.01)

(58) Field of Classification Search
CPC ........... G06T 1/20; G06T 15/005; G06T 1/60; G06T 15/04; G09G 5/363; G06F 3/14
See application file for complete search history.

(56) References Cited

U.S. PATENT DOCUMENTS 9,069,622 B2    6/2015   Post et al.
9,098,323 B2    8/2015   Mitra et al.
(Continued)

FOREIGN PATENT DOCUMENTS

WO       2014100558       6/2014

OTHER PUBLICATIONS

U.S. Appl. No. 14/822,511, filed Aug. 10, 2015, Nicholas Patrick Wilt, et al.

(Continued)

*Primary Examiner* — Todd Buttram
(74) *Attorney, Agent, or Firm* — Robert C. Kowert; Kowert, Hood, Munyon, Rankin & Goetzel, P.C.

(57) ABSTRACT

Methods, systems, and computer-readable media for disaggregated graphics asset management for virtualized graphics are disclosed. A virtual GPU attached to a virtual compute instance is provisioned in a multi-tenant provider network. The virtual compute instance is implemented using a physical compute instance, and the virtual GPU is implemented using a physical GPU. A plurality of graphics assets are added to a graphics asset repository. The graphics assets are associated with corresponding identifiers and access restrictions in the graphics asset repository. One or more graphics instructions are executed on the virtual GPU using one or more graphics assets corresponding to one or more identifiers associated with the graphics instructions. The one or more graphics assets are obtained by the virtual GPU from the graphics asset repository using the one or more identifiers.

18 Claims, 16 Drawing Sheets

(51) Int. Cl.
*G06F 9/455* (2018.01)
*G06F 9/50* (2006.01)

(56) References Cited

U.S. PATENT DOCUMENTS

| | | | |
|---|---|---|---|
| 10,181,173 B1* | 1/2019 | Wilt | G06T 1/20 |
| 2007/0033156 A1* | 2/2007 | Limpert | G06F 16/93 |
| 2011/0083131 A1 | 4/2011 | Pirzada et al. | |
| 2011/0134111 A1* | 6/2011 | Stone | G06F 9/45541 |
| | | | 345/419 |
| 2011/0182422 A1* | 7/2011 | Anderson | G06F 21/64 |
| | | | 380/30 |
| 2012/0069032 A1 | 3/2012 | Hansson et al. | |
| 2012/0154389 A1 | 6/2012 | Bohan et al. | |
| 2014/0055466 A1 | 2/2014 | Petrov et al. | |
| 2014/0169471 A1 | 6/2014 | He | |
| 2014/0176583 A1 | 6/2014 | Abiezzi et al. | |
| 2014/0181806 A1 | 6/2014 | Abiezzi et al. | |
| 2014/0215462 A1 | 7/2014 | Kuo et al. | |
| 2014/0286390 A1 | 9/2014 | Fear | |
| 2015/0067672 A1 | 3/2015 | Mitra et al. | |
| 2015/0097844 A1 | 4/2015 | Wankhede et al. | |
| 2015/0105148 A1 | 4/2015 | Consul et al. | |
| 2015/0116335 A1 | 4/2015 | Chen et al. | |
| 2015/0220354 A1 | 8/2015 | Nair | |
| 2015/0221063 A1* | 8/2015 | Kim | G06T 1/60 |
| | | | 345/557 |
| 2015/0370589 A1 | 12/2015 | Bidarkar et al. | |
| 2015/0370620 A1* | 12/2015 | Lai | G06F 9/445 |
| | | | 715/765 |
| 2015/0382056 A1* | 12/2015 | Burton | H04N 21/44016 |
| | | | 725/25 |
| 2016/0239333 A1 | 8/2016 | Cowperthwaite et al. | |
| 2016/0247248 A1 | 8/2016 | Ha et al. | |
| 2017/0004808 A1 | 1/2017 | Agashe et al. | |
| 2017/0039396 A1* | 2/2017 | Sharp | G06F 12/1458 |
| 2017/0300945 A1* | 10/2017 | Nigul | G06Q 30/0204 |
| 2018/0025173 A1* | 1/2018 | Keyes | G06F 21/6218 |
| | | | 726/4 |

OTHER PUBLICATIONS

U.S. Appl. No. 14/938,457, filed Nov. 11, 2015, Nicholas Patrick Wilt, et al.
U.S. Appl. No. 14/938,461, filed Nov. 11, 2015, Nicholas Patrick Wilt, et al.
U.S. Appl. No. 14/938,656, filed Nov. 11, 2015, Nicholas Patrick Wilt, et al.
U.S. Appl. No. 14/938,654, filed Nov. 11, 2015, Nicholas Patrick Wilt, et al.
U.S. Appl. No. 15/178,292, filed Jun. 9, 2016, Nicholas Patrick Wilt.
U.S. Appl. No. 15/177,255, filed Jun. 8, 2016, Nicholas Patrick Wilt.
Federico Silla "The rCUDA technology: an inexpensive way to improve the performance of GPU-based clusters." Talk at Computer Engineering Laboratory, Delft University of Technology. Delft, Netherlands. Apr. 2015, pp. 1-47.
Nice, "DCV Administration Guide," Nice s.r.l, Asti, Italy, Jul. 2015, Source: https://www.nice-software.com/download/nice-dcv-2014#documentation, pp. 1-96.
Antonio J. Pena, et al., "A Complete and Efficient CUDA-Sharing Solution for HPC Clusters", Sep. 2, 2014, Retrieved from the Internet: URL: http://www.mcs.anl.gov/papers/P5137-0514.pdf, pp. 1-28.
Lin Shi, et al., "vCUDA: GPU-Accelerated High-Performance Computing in Virtual Machines", IEEE Transaction on Computers, vol. 61, No. 6, Jun. 2012, pp. 804-816.
Matthew Danish, et al., "Virtual-CPU Scheduling in the Quest Operating System", 2011 17th IEEE Real-Time and Embedded Technology and Application Symposium, Apr. 11, 2011, pp. 169-179.
Mark Panahi, et al., "A Framework for Real-Time Service-Oriented Architecture", 2009 IEEE Conference on Commerce and Enterprise Computing (CED '09), Jul. 20, 2009, pp. 460-467.
Marcos D. Assuncao, et al., "CloudAffinity: A Framework for Matching Servers to Cloudmates", 2012 IEEE Network Operations and Management Symposium (NOMS 2012), Apr. 16-20, 2012, pp. 213-220.
Shinpei Kato, et al., "Gdev: First-Class GPU Resource Management in the Operating System", Jun. 1, 2012, Retrieved from URL: https://www.usenix.org/system/files/conference/atc12/atc12-final1319.pdf, pp. 1-12.
U.S. Appl. No. 15/249,150, filed Aug. 26, 2016, Ingegneri.
U.S. Appl. No. 15/374,509, filed Dec. 9, 2016, Featonby, et al.
U.S. Appl. No. 15/417,064, filed Jan. 26, 2017, Featonby, et al.
U.S. Appl. No. 15/439,751, filed Feb. 22, 2017, Surani, et al.
Jeff Weiss, et al., "Nvidia Grid VCPU Deployment Guide for Vmware Horizon 6.1", Nvidia TechPub, Mar. 1, 2015, Retrieved from URL: http://www.vmware.com/content/dam/digitalmarketing/vmware/en/pdf/products/horizon/grid-vgpu-deployement-guide.pdf, pp. 1-14.
Installing VMware VGPU on vSphere 6.0, Martijn Smit, Mar. 7, 2015, pp. 1-10.
U.S. Appl. No. 15/470,821, filed Mar. 27, 2017, Malcolm Featonby, et al.

* cited by examiner

DISAGGREGATED GRAPHICS ASSET MANAGEMENT FOR VIRTUALIZED GRAPHICS

This application is a continuation of U.S. patent application Ser. No. 15/177,262, filed Jun. 8, 2016, which is hereby incorporated by reference herein in its entirety.

BACKGROUND

Many companies and other organizations operate computer networks that interconnect numerous computing systems to support their operations, such as with the computing systems being co-located (e.g., as part of a local network) or instead located in multiple distinct geographical locations (e.g., connected via one or more private or public intermediate networks). For example, distributed systems housing significant numbers of interconnected computing systems have become commonplace. Such distributed systems may provide back-end services to servers that interact with clients. Such distributed systems may also include data centers that are operated by entities to provide computing resources to customers. Some data center operators provide network access, power, and secure installation facilities for hardware owned by various customers, while other data center operators provide "full service" facilities that also include hardware resources made available for use by their customers. As the scale and scope of distributed systems have increased, the tasks of provisioning, administering, and managing the resources have become increasingly complicated.

The advent of virtualization technologies for commodity hardware has provided benefits with respect to managing large-scale computing resources for many clients with diverse needs. For example, virtualization technologies may allow a single physical computing device to be shared among multiple users by providing each user with one or more virtual machines hosted by the single physical computing device. Each such virtual machine may be a software simulation acting as a distinct logical computing system that provides users with the illusion that they are the sole operators and administrators of a given hardware computing resource, while also providing application isolation and security among the various virtual machines. With virtualization, the single physical computing device can create, maintain, or delete virtual machines in a dynamic manner.

Figure 1:
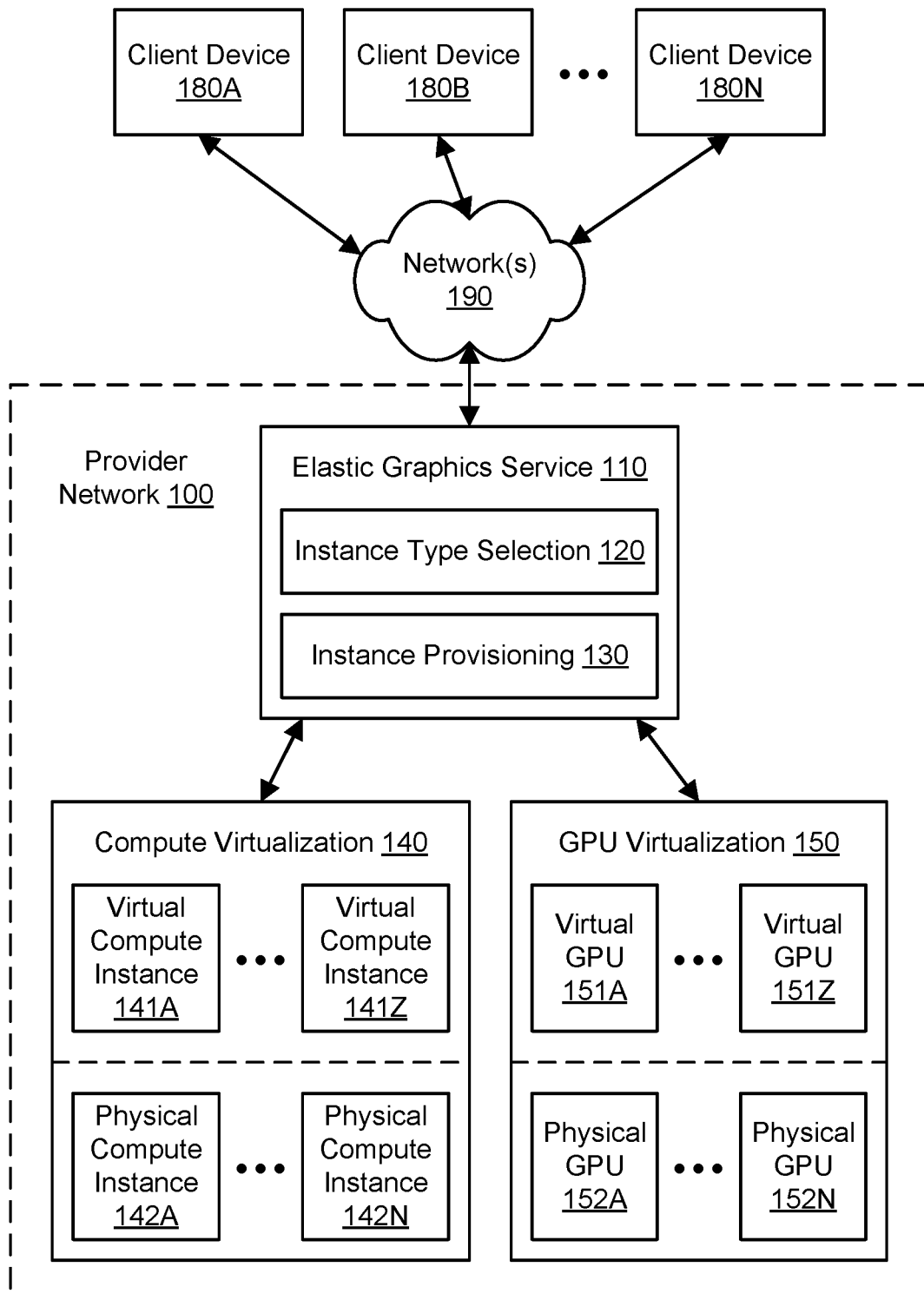
FIG. 1 illustrates an example system environment for virtualizing graphics processing in a provider network, according to one embodiment.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning "having the potential to"), rather than the mandatory sense (i.e., meaning "must"). Similarly, the words "include," "including," and "includes" mean "including, but not limited to."

DETAILED DESCRIPTION OF EMBODIMENTS

Various embodiments of methods, systems, and computer-readable media for disaggregated graphics asset delivery for virtualized graphics processing are described. Using the techniques described herein, a virtual compute instance may be provisioned, and a virtual graphics processing unit (GPU) may be attached to the instance to provide virtualized graphics processing. The virtual compute instance may be configured to execute an application using the virtualized graphics processing provided by the virtual GPU. To reduce the amount of data transfer between the virtual compute instance and the virtual GPU, graphics assets (e.g., textures, vertex buffers, 3D models, and so on) may be referred to by compact identifiers in the application and in the graphics instructions provided to the virtual GPU by the virtual compute instance. The graphics assets themselves may be obtained by the virtual GPU using the identifiers, e.g., from a graphics asset repository. An asset management service may map the identifiers to the assets and deliver the assets to the virtual GPU. The graphics asset repository may be implemented in a multi-tenant provider network with the virtual compute instance and virtual GPU. In one embodiment, the repository or a portion thereof may be positioned close to one or more virtual GPUs in the provider network in order to minimize network latency. Caching and/or pre-fetching of graphics assets may be used at the virtual GPU for performance optimization. Multiple applications or instances of the same application may refer to the same graphics asset in the repository, e.g., using the same compact identifier. Particular graphics assets may be associated with access restrictions to limit their availability to particular accounts, organizations, users, user groups, or applications, or graphics assets may instead be globally accessible.

Various embodiments of methods, systems, and computer-readable media for disaggregated graphics asset management for virtualized graphics processing are described. Using the techniques described herein, a virtual compute instance may be provisioned, and a virtual graphics processing unit (GPU) may be attached to the instance to provide virtualized graphics processing. The virtual compute instance may be configured to execute an application using the virtualized graphics processing provided by the virtual GPU. To reduce the amount of data transfer between the virtual compute instance and the virtual GPU, graphics assets (e.g., textures, vertex buffers, 3D models, and so on) may be referred to by compact identifiers in the application and in the graphics instructions provided to the virtual GPU by the virtual compute instance. The graphics assets themselves may be obtained by the virtual GPU using the identifiers, e.g., from a graphics asset repository. Developers may manage their assets using an interface to the repository, e.g., as provided by an asset management service. When a developer registers a graphics asset with the asset management service, the asset management service may determine an identifier corresponding to the asset (e.g., representing a handle or secure hash) and store the asset in the repository using an association with the corresponding identifier. Graphics assets may be associated with access restrictions to limit their availability to particular accounts, organizations, users, user groups, or applications, or graphics assets may instead be globally accessible. Different pools of identifiers may be scoped to different sets of users, accounts, organizations, or applications according to the access restrictions. The contents of an identifier pool may be queried by a developer who has appropriate access. Caching and/or pre-fetching of graphics assets may be used at the virtual GPU for performance optimization, and caching and/or pre-fetching policies may be configured by developers for particular assets, identifier pools, applications, and so on.

Virtualized Graphics Processing in a Provider Network

FIG. 1 illustrates an example system environment for virtualizing graphics processing in a provider network, according to one embodiment. Clients of a provider network 100 may use computing devices such as client devices 180A-180N to access an elastic graphics service 110 and other resources offered by the provider network. The client devices 180A-180N may be coupled to the provider network 100 via one or more networks 190. The provider network 100 may provide compute virtualization 140 such that a plurality of virtual compute instances 141A-141Z may be implemented using a plurality of physical compute instances 142A-142N. The virtual compute instances 141A-141Z may also be referred to herein as virtual machines (VMs). Similarly, the provider network 100 may provide GPU virtualization 150 such that a plurality of virtual GPUs 151A-151Z may be implemented using a plurality of physical GPUs 152A-152N. An example hardware architecture for implementing virtual GPUs using physical GPUs is discussed with reference to FIG. 5. The underlying physical compute instances 142A-142N may be heterogeneous, and the underlying physical GPUs 152A-152N may be heterogeneous as well. In one embodiment, the compute virtualization 140 may use techniques for multi-tenancy to provision virtual compute instances 141A-141Z that exceed the physical compute instances 142A-142N in number. In one embodiment, the GPU virtualization 150 may use techniques for multi-tenancy to provision virtual GPUs 151A-151Z that exceed the physical GPUs 152A-152N in number.

The elastic graphics service 110 may offer, to clients, selection and provisioning of virtualized compute instances with attached virtualized GPUs. Accordingly, the elastic graphics service 110 may include an instance type selection functionality 120 and an instance provisioning functionality 130. In one embodiment, the provider network 100 may offer virtual compute instances 141A-141Z with varying computational and/or memory resources. In one embodiment, each of the virtual compute instances 141A-141Z may correspond to one of several instance types. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, an instance type may be selected for a client, e.g., based (at least in part) on input from the client. For example, a client may choose an instance type from a predefined set of instance types. As another example, a client may specify the desired resources of an instance type, and the instance type selection functionality 120 may select an instance type based on such a specification.

In one embodiment, the provider network 100 may offer virtual GPUs 151A-151Z with varying graphics processing capabilities. In one embodiment, each of the virtual GPUs 151A-151Z may correspond to one of several virtual GPU classes. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, a virtual GPU class may be selected for a client, e.g., based (at least in part) on input from the client. For example, a client may choose a virtual GPU class from a predefined set of virtual GPU classes. As another example, a client may specify the desired resources of a virtual GPU class, and the instance type selection functionality 120 may select a virtual GPU class based on such a specification.

Therefore, using the instance type selection functionality 120, clients (e.g., using client devices 180A-180N) may specify requirements for virtual compute instances and virtual GPUs. The instance provisioning functionality 130 may provision virtual compute instances with attached virtual GPUs based on the specified requirements (including any specified instance types and virtual GPU classes). As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. For a particular client, a virtual compute instance may be provisioned of the instance type selected by or for the client, and the virtual compute instance may be provisioned with an attached virtual GPU of the GPU class selected by or for the client. In one embodiment, a virtual GPU of substantially any virtual GPU class may be attached to a virtual compute instance of substantially any instance type.

The provider network 100 may be set up by an entity such as a company or a public sector organization to provide one or more services (such as various types of cloud-based computing or storage) accessible via the Internet and/or other networks to client devices 180A-180N. Provider network 100 may include numerous data centers hosting various resource pools, such as collections of physical and/or virtualized computer servers, storage devices, networking equipment and the like (e.g., implemented using computing system 3000 described below with regard to FIG. 13), needed to implement and distribute the infrastructure and services offered by the provider network 100. In some embodiments, provider network 100 may provide computing resources, such as compute virtualization service 140 and GPU virtualization service 150; storage services, such as a block-based storage service, key-value based data stores, or various types of database systems; and/or any other type of network-based services. Client devices 180A-180N may access these various services offered by provider network 100 via network(s) 190. Likewise, network-based services may themselves communicate and/or make use of one another to provide different services. For example, computing resources offered to client devices 180A-180N in units called "instances," such as virtual or physical compute instances or storage instances, may make use of particular data volumes, providing virtual block storage for the compute instances. The provider network 100 may implement or provide a multi-tenant environment such that multiple clients (e.g., using client devices 180A-180N) may access or use a particular resource in a substantially simultaneous manner.

As noted above, compute virtualization service 140 may offer various virtual compute instances 141A-141Z to client devices 180A-180N. A virtual compute instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor). A number of different types of computing devices may be used singly or in combination to implement the compute instances of the compute virtualization service 140 in different embodiments, including general purpose or special purpose computer servers, storage devices, network devices and the like. In some embodiments, client devices 180A-180N or other any other user may be configured (and/or authorized) to direct network traffic to a virtual compute instance. In various embodiments, virtual compute instances 141A-141Z may attach or map to one or more data volumes provided by a storage service in order to obtain persistent storage for performing various operations. Using the techniques described herein, virtual GPUs 151A-151Z may be attached to virtual compute instances 141A-141Z to provide graphics processing for the virtual compute instances.

Virtual compute instances 141A-141Z may operate or implement a variety of different platforms, such as application server instances, Java™ virtual machines (JVMs) or other virtual machines, general purpose or special-purpose operating systems, platforms that support various interpreted or compiled programming languages such as Ruby, Perl, Python, C, C++ and the like, or high-performance computing platforms) suitable for performing client applications, without for example requiring the client devices 180A-180N to access an instance. In some embodiments, virtual compute instances 141A-141Z may have different instance types or configurations based on expected uptime ratios. The uptime ratio of a particular virtual compute instance may be defined as the ratio of the amount of time the instance is activated to the total amount of time for which the instance is reserved. Uptime ratios may also be referred to as utilizations in some implementations. If a client expects to use a compute instance for a relatively small fraction of the time for which the instance is reserved (e.g., 30%-35% of a year-long reservation), the client may decide to reserve the instance as a Low Uptime Ratio instance, and the client may pay a discounted hourly usage fee in accordance with the associated pricing policy. If the client expects to have a steady-state workload that requires an instance to be up most of the time, then the client may reserve a High Uptime Ratio instance and potentially pay an even lower hourly usage fee, although in some embodiments the hourly fee may be charged for the entire duration of the reservation, regardless of the actual number of hours of use, in accordance with pricing policy. An option for Medium Uptime Ratio instances, with a corresponding pricing policy, may be supported in some embodiments as well, where the upfront costs and the per-hour costs fall between the corresponding High Uptime Ratio and Low Uptime Ratio costs.

Virtual compute instance configurations may also include virtual compute instances with a general or specific purpose, such as computational workloads for compute intensive applications (e.g., high-traffic web applications, ad serving, batch processing, video encoding, distributed analytics, high-energy physics, genome analysis, and computational fluid dynamics), graphics intensive workloads (e.g., game streaming, 3D application streaming, server-side graphics workloads, rendering, financial modeling, and engineering design), memory intensive workloads (e.g., high performance databases, distributed memory caches, in-memory analytics, genome assembly and analysis), and storage optimized workloads (e.g., data warehousing and cluster file systems). In some embodiments, particular instance types for virtual compute instances may be associated with default classes for virtual GPUs. For example, some instance types may be configured without a virtual GPU as a default configuration, while other instance types designated for graphics intensive workloads may be designated with particular virtual GPU classes as a default configuration. Configurations of virtual compute instances may also include their location in a particular data center or availability zone, geographic location, and (in the case of reserved compute instances) reservation term length.

The client devices 180A-180N may represent or correspond to various clients or users of the provider network 100, such as customers who seek to use services offered by the provider network. The clients, users, or customers may represent persons, businesses, other organizations, and/or other entities. The client devices 180A-180N may be distributed over any suitable locations or regions. Each of the client devices 180A-180N may be implemented using one or more computing devices, any of which may be implemented by the example computing device 3000 illustrated in FIG. 13.

The client devices 180A-180N may encompass any type of client configurable to submit requests to provider network 100. For example, a given client device may include a suitable version of a web browser, or it may include a plug-in module or other type of code module configured to execute as an extension to or within an execution environment provided by a web browser. Alternatively, a client device may encompass an application such as a database application (or user interface thereof), a media application, an office application, or any other application that may make use of virtual compute instances, storage volumes, or other network-based services in provider network 100 to perform various operations. In some embodiments, such an application may include sufficient protocol support (e.g., for a suitable version of Hypertext Transfer Protocol [HTTP]) for generating and processing network-based service requests without necessarily implementing full browser support for all types of network-based data. In some embodiments, client devices 180A-180N may be configured to generate network-based service requests according to a Representational State Transfer (REST)-style network-based services architecture, a document- or message-based network-based services architecture, or another suitable network-based services architecture. In some embodiments, client devices 180A-180N (e.g., a computational client) may be configured to provide access to a virtual compute instance in a manner that is transparent to applications implement on the client device utilizing computational resources provided by the virtual compute instance. In at least some embodiments, client devices 180A-180N may provision, mount, and configure storage volumes implemented at storage services for file systems implemented at the client devices.

Client devices 180A-180N may convey network-based service requests to provider network 100 via external network(s) 190. In various embodiments, external network(s) 190 may encompass any suitable combination of networking hardware and protocols necessary to establish network-based communications between client devices 180A-180N and provider network 100. For example, the network(s) 190 may generally encompass the various telecommunications networks and service providers that collectively implement the Internet. The network(s) 190 may also include private networks such as local area networks (LANs) or wide area networks (WANs) as well as public or private wireless networks. For example, both a given client device and the provider network 100 may be respectively provisioned within enterprises having their own internal networks. In such an embodiment, the network(s) 190 may include the hardware (e.g., modems, routers, switches, load balancers, proxy servers, etc.) and software (e.g., protocol stacks, accounting software, firewall/security software, etc.) necessary to establish a networking link between the given client device and the Internet as well as between the Internet and the provider network 100. It is noted that in some embodiments, client devices 180A-180N may communicate with provider network 100 using a private network rather than the public Internet.

Figure 13:
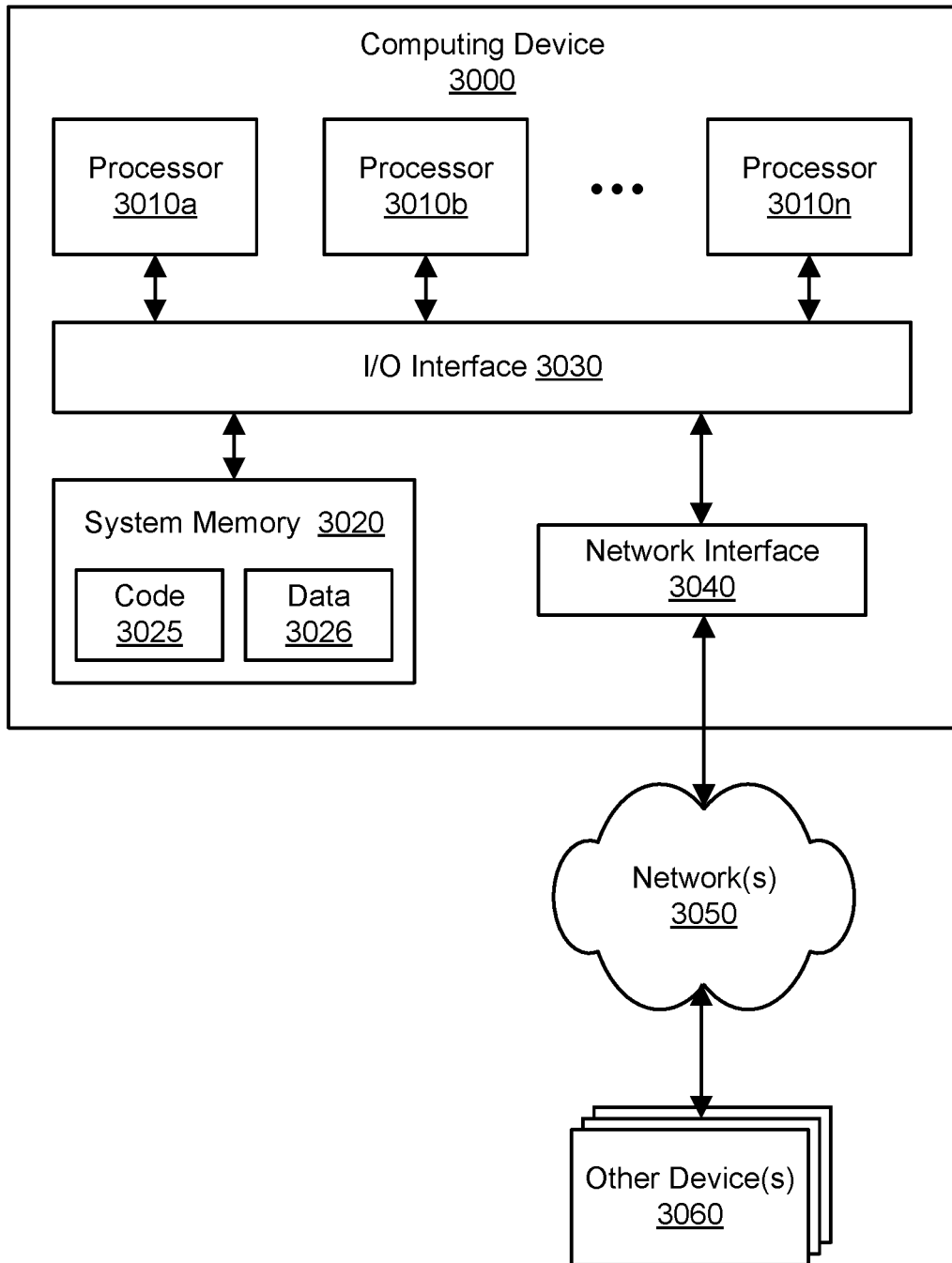
FIG. 13 illustrates an example computing device that may be used in some embodiments.

The provider network 100 may include a plurality of computing devices, any of which may be implemented by the example computing device 3000 illustrated in FIG. 13. In various embodiments, portions of the described functionality of the provider network 100 may be provided by the same computing device or by any suitable number of different computing devices. If any of the components of the provider network 100 are implemented using different computing devices, then the components and their respective computing devices may be communicatively coupled, e.g., via a network. Each of the illustrated components (such as the elastic graphics service 110 and its constituent functionalities 120 and 130) may represent any combination of software and hardware usable to perform their respective functions.

It is contemplated that the provider network 100 may include additional components not shown, fewer components than shown, or different combinations, configurations, or quantities of the components shown. For example, although physical compute instances 142A through 142N are shown for purposes of example and illustration, it is contemplated that different quantities and configurations of physical compute instances may be used. Similarly, although physical GPUs 152A through 152N are shown for purposes of example and illustration, it is contemplated that different quantities and configurations of physical GPUs may be used. Additionally, although three client devices 180A, 180B, and 180N are shown for purposes of example and illustration, it is contemplated that different quantities and configurations of client devices may be used. Aspects of the functionality described herein for providing virtualized graphics processing may be performed, at least in part, by components outside of the provider network 100.

Figure 2A:
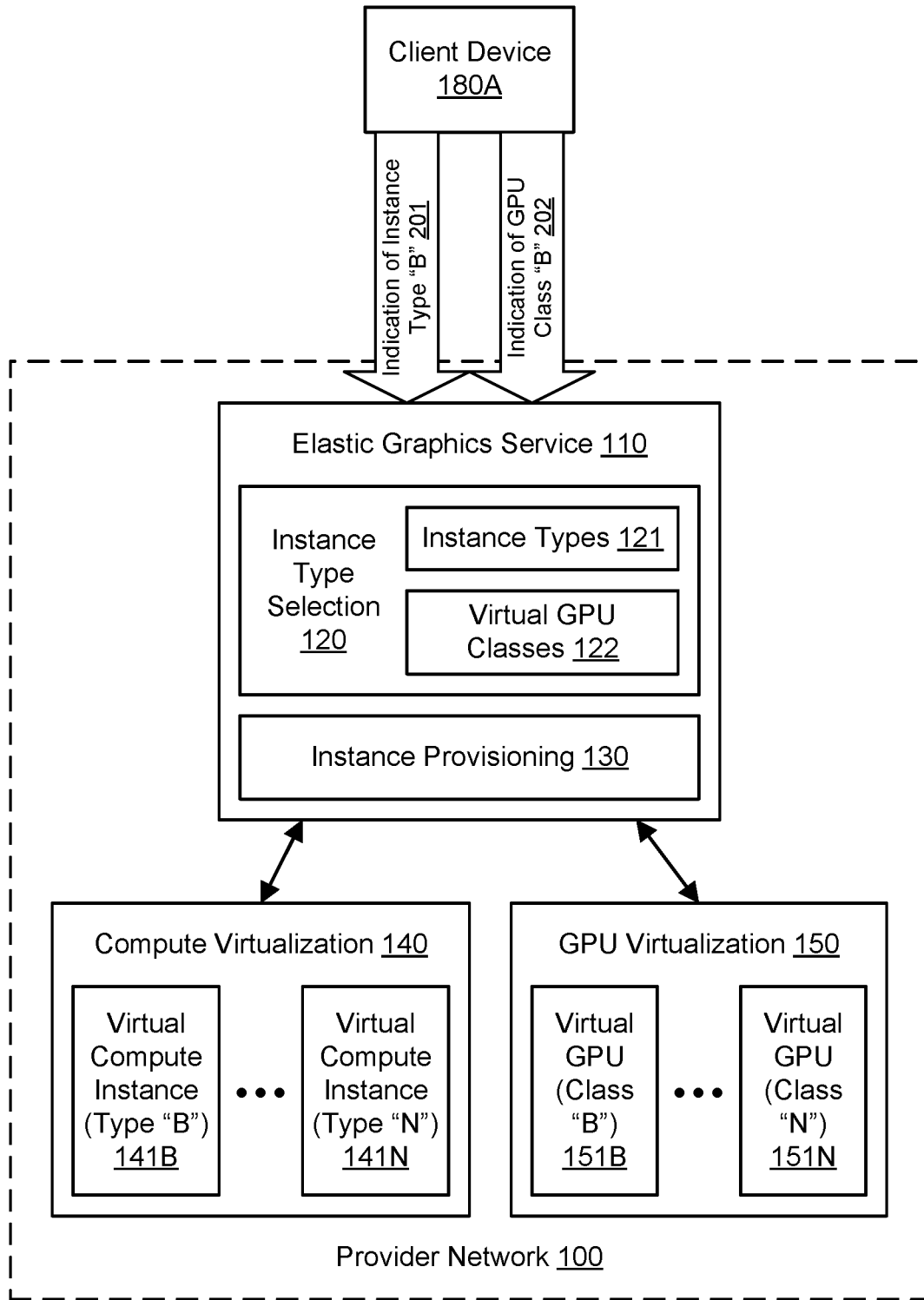
FIG. 2A illustrates further aspects of the example system environment for virtualizing graphics processing in a provider network, including selection of an instance type and virtual GPU class for a virtual compute instance with an attached virtual GPU, according to one embodiment.

FIG. 2A illustrates further aspects of the example system environment for virtualizing graphics processing in a provider network, including selection of an instance type and virtual GPU class for a virtual compute instance with an attached virtual GPU, according to one embodiment. As discussed above, the provider network 100 may offer to the client device 180A a plurality of instance types 121 for virtual compute instances. As shown for purposes of illustration and example, virtual compute instances of type "B" 141B through type "N" 141N may be offered. However, it is contemplated that any suitable number and configuration of virtual compute instance types may be offered to clients by the provider network 100. An instance type may be characterized by its computational resources (e.g., number, type, and configuration of central processing units [CPUs] or CPU cores), memory resources (e.g., capacity, type, and configuration of local memory), storage resources (e.g., capacity, type, and configuration of locally accessible storage), network resources (e.g., characteristics of its network interface and/or network capabilities), and/or other suitable descriptive characteristics. Using the instance type selection functionality 120, the client device 180A may provide an indication, specification, or other selection 201 of a particular instance type. For example, a client may choose or the instance type "B" from a predefined set of instance types using input 201. As another example, a client may specify the desired resources of an instance type using input 201, and the instance type selection functionality 120 may select the instance type "B" based on such a specification. Accordingly, the virtual compute instance type may be selected by the client or on behalf of the client, e.g., using the instance type selection functionality 120.

As discussed above, the provider network 100 may offer to the client device 180A a plurality of virtual GPU classes 122 for virtual GPUs. As shown for purposes of illustration and example, virtual GPUs of class "B" 151B through class "N" 151N may be offered. However, it is contemplated that any suitable number and configuration of virtual GPU classes may be offered to clients by the provider network 100. A virtual GPU class may be characterized by its computational resources for graphics processing, memory resources for graphics processing, and/or other suitable descriptive characteristics. In one embodiment, the virtual GPU classes may represent subdivisions of graphics processing capabilities of a physical GPU, such as a full GPU, a half GPU, a quarter GPU, and so on. Using the instance type selection functionality 120, the client device 180A may provide an indication, specification, or other selection 202 of a particular virtual GPU class. For example, a client may choose the virtual GPU class "B" from a predefined set of virtual GPU classes using input 202. As another example, a client may specify the desired resources of a virtual GPU class using input 202, and the instance type selection functionality 120 may select the virtual GPU class "B" based on such a specification. Accordingly, the virtual GPU class may be selected by the client or on behalf of the client, e.g., using the instance type selection functionality 120.

Figure 2B:
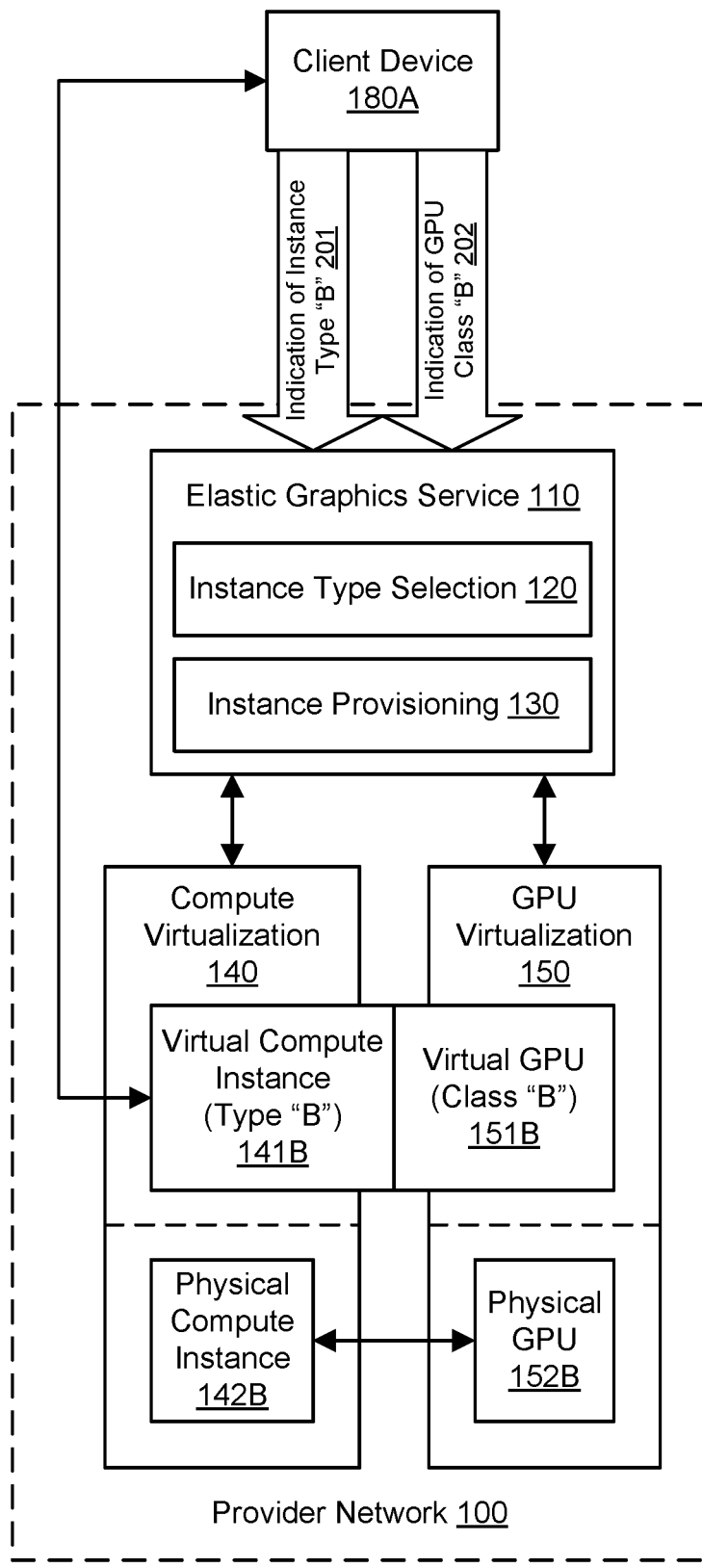
FIG. 2B illustrates further aspects of the example system environment for virtualizing graphics processing in a provider network, including provisioning of a virtual compute instance with an attached virtual GPU, according to one embodiment.

FIG. 2B illustrates further aspects of the example system environment for virtualizing graphics processing in a provider network, including provisioning of a virtual compute instance with an attached virtual GPU, according to one embodiment. The instance provisioning functionality 130 may provision a virtual compute instance 141B with an attached virtual GPU 151B based on the specified instance type "B" and the specified virtual GPU class "B". The provisioned virtual compute instance 141B may be implemented by the compute virtualization functionality 140 using suitable physical resources such as a physical compute instance 142B, and the provisioned virtual GPU 151B may be implemented by the GPU virtualization functionality 150 using suitable physical resources such as a physical GPU 152B. As used herein, provisioning a virtual compute instance generally includes reserving resources (e.g., computational and memory resources) of an underlying physical compute instance for the client (e.g., from a pool of available physical compute instances and other resources), installing or launching required software (e.g., an operating system), and making the virtual compute instance available to the client for performing tasks specified by the client. In one embodiment, a virtual GPU of substantially any virtual GPU class may be attached to a virtual compute instance of substantially any instance type. To implement the virtual compute instance 141B with the attached virtual GPU 151B, a physical compute instance 142B may communicate with a physical GPU 152B, e.g., over a network. The physical GPU 152B may be located in a different computing device than the physical compute instance 142B. Even though they may be implemented using separate hardware, the virtual GPU 151B may be said to be attached to the virtual compute instance 141B, or the virtual compute instance may be said to include the virtual GPU. The virtual GPU 151B may be installed on a device that may reside in various locations relative to the physical GPU 152B, e.g., on the same rack, the same switch, the same room, and/or other suitable locations on the same network. A vendor of the physical GPU 152B may be hidden from the client device 180A.

Figure 3:
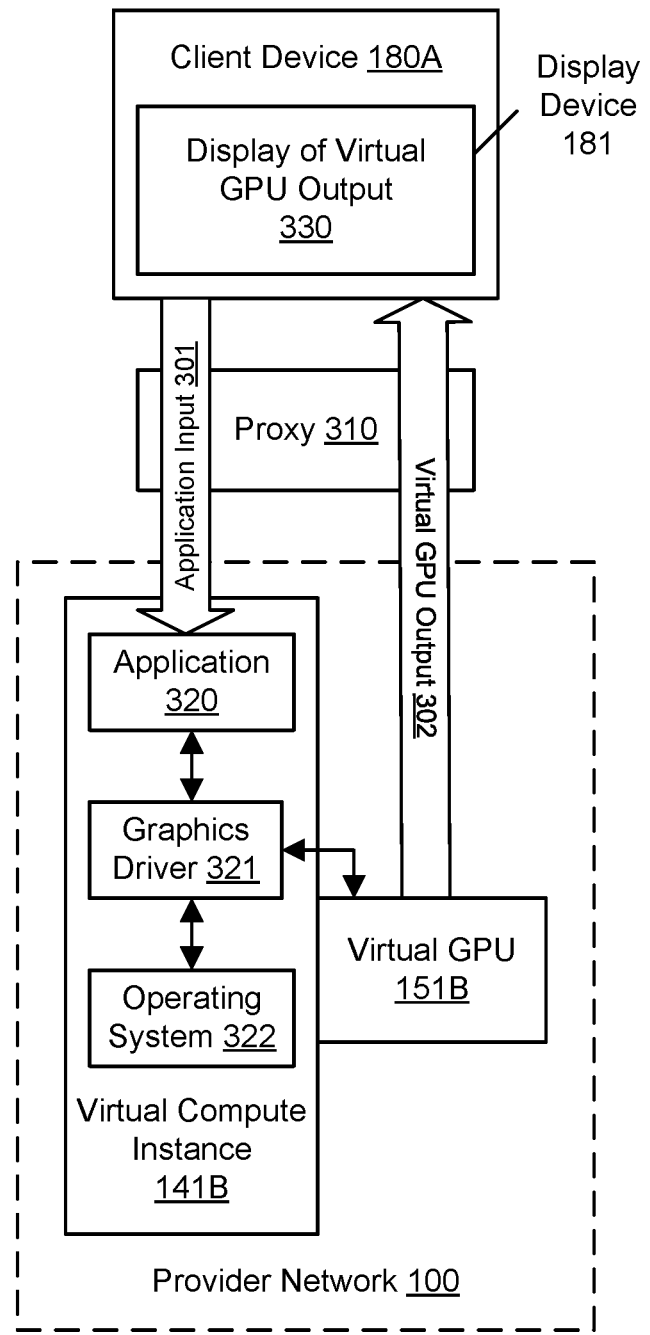
FIG. 3 illustrates the use of a virtual compute instance with a virtual GPU to generate virtual GPU output for display on a client device, according to one embodiment.

FIG. 3 illustrates the use of a virtual compute instance with a virtual GPU to generate virtual GPU output for display on a client device, according to one embodiment. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 320. The application 320 may be selected or provided by the client. The virtual compute instance 141B may also be configured with a particular operating system 322 that provides support for the application 321. Additionally, the virtual compute instance 141B may be configured with a particular graphics driver 321. The graphics driver 321 may interact with the virtual GPU 151B to provide graphics processing for the application 320, including accelerated two-dimensional graphics processing and/or accelerated three-dimensional graphics processing. In one embodiment, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may communicate with the virtual compute instance 141B through a proxy 310. Various other communications may be sent through the proxy 310, including for example virtual GPU output 302 from the virtual GPU 151B to the client device 180A. Use of the proxy 310 may hide the address of the virtual compute instance and any associated resources (including a computing device that implements the virtual GPU 151B) from the client device 180A. The proxy 310 and virtual compute instance 141B may communicate using a suitable remoting protocol. In various embodiments, the proxy 310 may or may not be part of the provider network 100. The client device 180A may provide application input 301 to the application 320 running on the virtual compute instance 141B. For example, the application input 301 may include data to be operated upon by the application 320 and/or instructions to control the execution of the application.

Using the graphics processing provided by the virtual GPU 151B, execution of the application may generate virtual GPU output 302. The virtual GPU output 302 may be provided to the client device 180A, e.g., from the virtual GPU 151B or virtual compute instance 141B. In one embodiment, the virtual GPU output 302 may be sent from the virtual GPU 151B (e.g., from a computing device that includes the virtual GPU) to the client device 180A while bypassing the rest of the virtual compute instance 141B (e.g., the underlying physical compute instance 142B). The virtual GPU output 302 may also be sent to the client device 180A through the proxy 310. The proxy 310 and virtual GPU 151B may communicate using a suitable remoting protocol. In one embodiment, the virtual GPU output 302 may be returned to the virtual compute instance 141B, and the virtual compute instance may send the virtual GPU output to the client device 180A. In one embodiment, the client device 180A may forward the virtual GPU output 302 to another component.

In one embodiment, a display device 181 associated with the client device 180A may present a display 330 of the virtual GPU output 302. In one embodiment, the virtual GPU output 302 may include pixel data, image data, video data, or other graphical data. In one embodiment, the virtual GPU output 302 may drive a full-screen display on the display device 181. Portions of the virtual GPU output 302 may be streamed to the client device 180A over time. In one embodiment, the virtual GPU output 302 may be composited with one or more other sources of graphical data to produce the display 330. In one embodiment, the virtual GPU 151B may be used for general-purpose computing (e.g., GPGPU computing), and the virtual GPU output 302 may not include pixel data or other graphical data. In various embodiments, the client device 180A may process or transform all or part of the virtual GPU output 302 before displaying the output. For example, a CPU, GPU, or coprocessor on the client device 180A may transform portions of the virtual GPU output 302 and display the results on the display device 181.

In various embodiments, any suitable technique(s) may be used to offload graphics processing from a virtual compute instance to a physical GPU. In one embodiment, an API shim may intercept calls to a graphics API and marshal the calls over a network to an external computing device that includes a physical GPU. In one embodiment, a driver shim may surface a proprietary driver to the virtual compute instance, intercept calls, and marshal the calls over a network to an external computing device that includes a physical GPU. In one embodiment, a hardware shim may surface a hardware interface to the virtual compute instance and marshal attempts by the instance to interact with the physical GPU.

Figure 4:
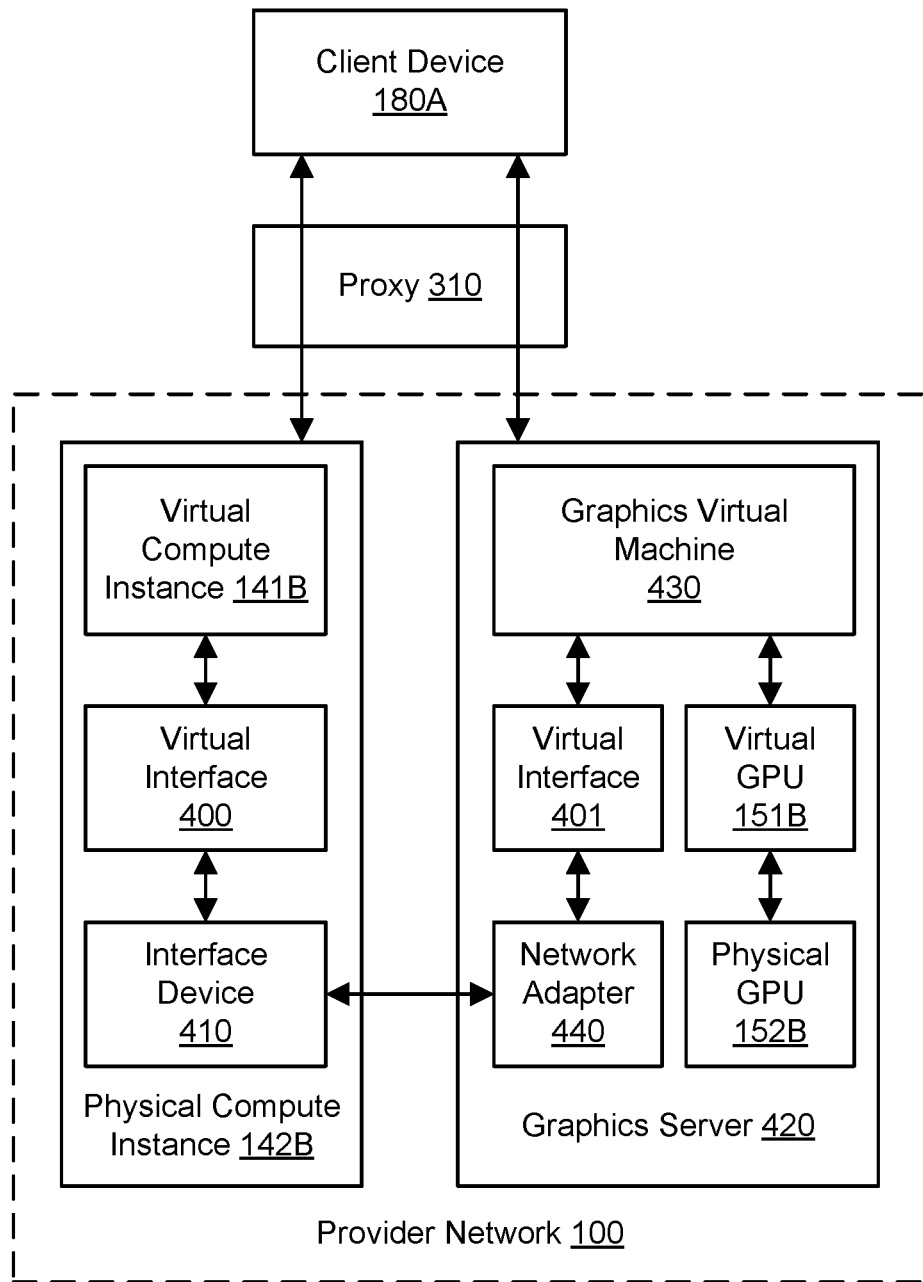
FIG. 4 illustrates an example hardware architecture for implementing virtualized graphics processing, according to one embodiment.

FIG. 4 illustrates an example hardware architecture for implementing virtualized graphics processing, according to one embodiment. In one embodiment, the virtual compute instance 141B may be implemented using a physical compute instance 142B, and the virtual GPU 151B attached to that instance 141B may be implemented using a separate and distinct computing device termed a graphics server 420. The virtual compute instance 141B may use a virtual interface 400 to interact with an interface device 410. The virtual interface 400 may enable the virtual compute instance 141B to send and receive network data. The interface device 410 may include a network interface and a custom hardware interface. Via the custom hardware interface, the interface device 410 may run program code to emulate a GPU interface and appear to the virtual compute instance 141B to implement or include the virtual GPU 151B. In one embodiment, the interface device 410 may present a graphics API to the virtual compute instance 141B and receive API calls for graphics processing (e.g., accelerated 3D graphics processing). Via the network interface, the interface device 410 may communicate with the graphics server 420 (and thus with the physical GPU 152B) over a network. The interface device 410 may be implemented in any suitable manner, e.g., as an expansion card (such as a PCI Express card) or attached peripheral device for the physical compute instance 142B. The interface device 410 may use single root I/O virtualization to expose hardware virtual functions to the virtual compute instance 141B. In one embodiment, the physical compute instance 142B may implement a plurality of virtual compute instances, each with its own virtual interface, and the virtual compute instances may use the interface device 410 to interact with the corresponding virtual GPUs on one or more graphics servers. The physical compute instance 142B may communicate with the proxy 310 using a suitable remoting protocol, e.g., to send data to and receive data from the client device 180A.

Graphics offload performed by the interface device 410 (e.g., by executing custom program code on the interface device) may translate graphics API commands into network traffic (encapsulating the graphics API commands) that is transmitted to the graphics server 420, and the graphics server 420 may execute the commands on behalf of the interface device. The graphics server 420 may include a network adapter 440 that communicates with the interface device 410 (e.g., with the network interface of the interface device) over a network. In one embodiment, the interface device 410 may receive calls to a graphics API (using the custom hardware interface) and generate graphics offload traffic to be sent to the network adapter 440 (using the network interface). The graphics server 410 may implement a graphics virtual machine 430. Any suitable technologies for virtualization may be used to implement the graphics virtual machine 430. In one embodiment, the graphics virtual machine 430 may represent a generic virtual machine that is GPU-capable and is dedicated to providing accelerated graphics processing using one or more virtual GPUs. The graphics virtual machine 430 may be coupled to the network adapter 440 using a virtual interface 401. The virtual interface 401 may enable the graphics virtual machine 430 to send and receive network data. The graphics virtual machine 430 may implement the virtual GPU 151B using the graphics processing capabilities of the physical GPU 152B. In one embodiment, the physical GPU 152B can be accessed directly by the graphics virtual machine 430, and the physical GPU 152B can use direct memory access to write to and read from memory managed by the graphics virtual machine. In one embodiment, the graphics server 420 may implement a plurality of virtual GPUs (such as virtual GPU 151B) using one or more physical GPUs (such as physical GPU 152B), and the virtual GPUs may interact with the corresponding virtual compute instances on one or more physical compute instances over a network. The graphics server 420 may communicate with the proxy 310 using a suitable remoting protocol, e.g., to send data to and receive data from the client device 180A. For example, the graphics server 420 may generate virtual GPU output based on the commands sent from the interface device 410. The virtual GPU output may be provided to the client device 180A through the proxy 310, e.g., from the physical compute instance 142B or graphics server 420.

Figure 5:
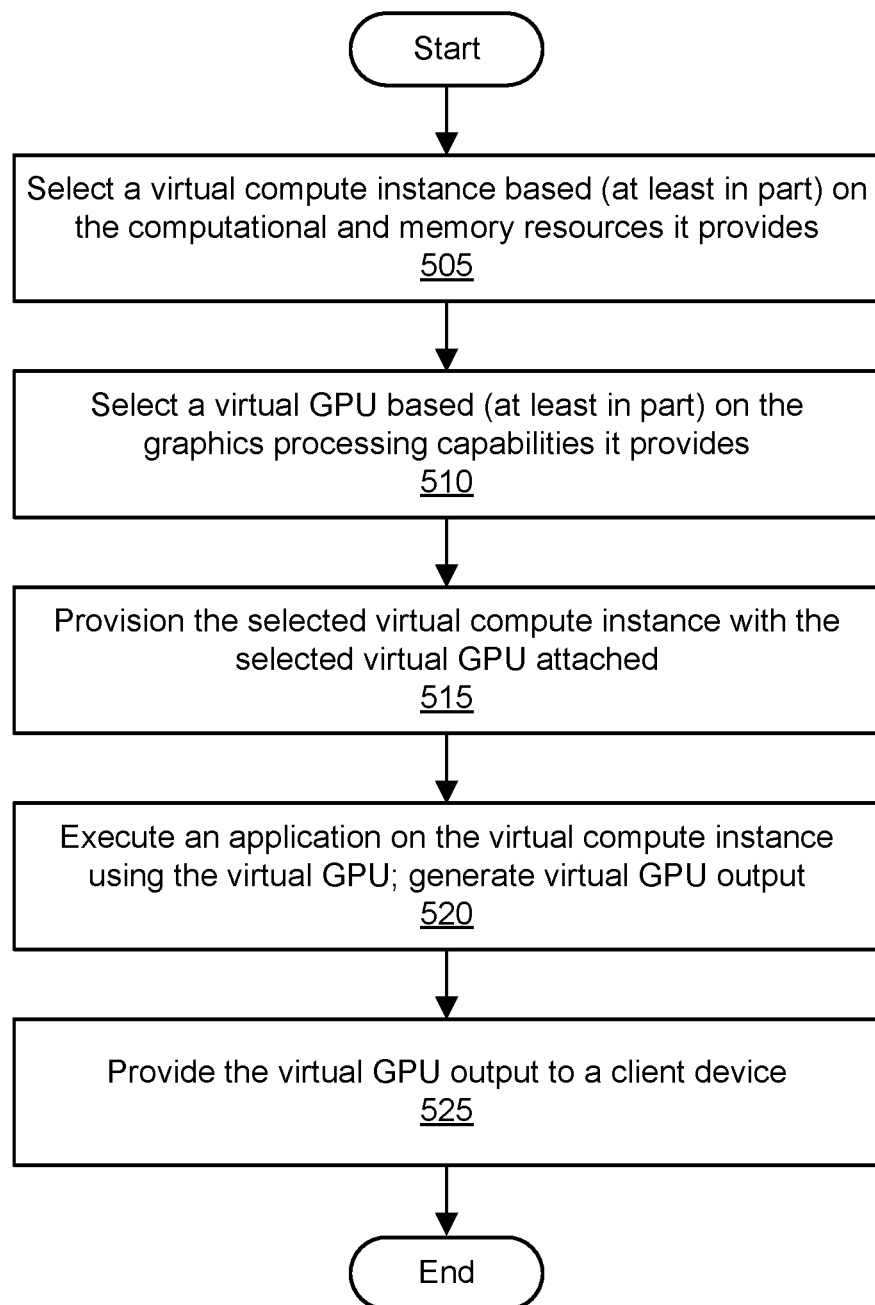
FIG. 5 is a flowchart illustrating a method for virtualizing graphics processing in a provider network, according to one embodiment.

FIG. 5 is a flowchart illustrating a method for virtualizing graphics processing in a provider network, according to one embodiment. As shown in 505, a virtual compute instance may be selected. The virtual compute instance may be selected based (at least in part) on computational and memory resources provided by the virtual compute instance. For example, the virtual compute instance may be selected based (at least in part) on a selection of an instance type by a user. As shown in 510, a virtual GPU may be selected. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU.

As shown in 515, the selected virtual compute instance may be provisioned with the selected virtual GPU attached. In one embodiment, the elastic graphics service may interact with one or more other services or functionalities of a provider network, such as a compute virtualization functionality and/or GPU virtualization functionality, to provision the instance with the virtual GPU. The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 520, an application may be executed on the virtual compute instance using the virtual GPU. Execution of the application may include execution of instructions on the virtual compute instance (e.g., on the underlying physical compute instance) and/or virtual GPU (e.g., on the underlying physical GPU). Execution of the application using the virtual GPU may generate virtual GPU output, e.g., output produced by executing instructions or otherwise performing tasks on the virtual GPU. As shown in 525, the virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device. Execution of the application using the virtual GPU may include graphics processing (e.g., acceleration of three-dimensional graphics processing) for the application using a graphics API.

In some embodiments, scaling techniques may be used with the techniques for virtualized graphics processing described herein. A virtual compute instance may be provisioned, and a first set of one or more GPU(s) may be attached to the instance to provide graphics processing. The first set of one or more virtual GPUs may provide a particular level of graphics processing. After a change in GPU requirements for the instance is determined, the second set of one or more virtual GPU(s) may be selected and attached to the virtual compute instance to replace the graphics processing of the first virtual GPU(s) with a different level of graphics processing. The second virtual GPU(s) may be selected based on the change in GPU requirements. Depending upon the change in GPU requirements, such a scaling operation may migrate graphics processing for a virtual compute instance from a less capable or smaller virtual GPU class to a more capable or larger virtual GPU class or from a more capable or larger virtual GPU class to a less capable or smaller virtual GPU class. In one embodiment, the migration of graphics processing may be performed based (at least in part) on user input representing a change in GPU requirements. In one embodiment, the migration of graphics processing may be performed based (at least in part) on detection of an increase in graphics workload. Live migration may be performed while applications are being executed using the first virtual GPU(s) in a manner that does not require changing or relaunching the applications. Migration of the virtual compute instance to a different physical compute instance may also be performed, e.g., to reduce network latency associated with virtualized graphics processing.

In some embodiments, placement optimization techniques may be used with the techniques for virtualized graphics processing described herein. Optimization of resource placement may improve one or more metrics (e.g., related to resource usage or cost) for GPU virtualization. Physical compute instance(s) may be used to implement virtual compute instance(s), and physical GPU(s) may be used to implement virtual GPU(s) attached to the virtual compute instance(s). Using techniques for placement optimization, locations of the virtual compute instance(s) and/or virtual GPU(s) may be selected in the provider network (from among a set of available physical compute instance(s) and/or physical GPU(s)) based on any suitable placement criteria. The one or more placement criteria may be based (at least in part) on metrics associated with maximizing performance, minimizing cost, minimizing energy usage, and/or any other suitable metrics. The placement criteria may also be associated with network locality. For example, to minimize network latency and/or network usage, a virtual compute instance and attached virtual GPU may be placed in the same rack in the same data center such that network communication between the underlying physical compute instance and physical GPU may not extend beyond a top-of-rack switch or other networking component in the rack. If locations within the same rack are not available, then nearby locations within the same data center may be selected for a virtual compute instance and attached virtual GPU. Placement may be optimized in this manner not only for newly provisioned resources but also for migration of a virtual compute instance and/or attached virtual GPU after their use has begun. When scaling is performed for GPU virtualization as discussed above, the locations of any virtual GPUs may be selected based on placement criteria, and/or the location of the virtual compute instance may be moved based on placement criteria.

In some embodiments, application-specific techniques may be used with the techniques for virtualized graphics processing described herein. A virtual compute instance may be provisioned and may be configured to execute an application. The application may be associated with graphics requirements. For example, an application manifest may specify a recommended graphics processing unit (GPU) class and/or size of video memory for the application, or analysis of execution of the application may determine graphics requirements for the application. A virtual GPU may be selected for the virtual compute instance based (at least in part) on the graphics requirements for the application. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. The application may be executed on the virtual compute instance using the virtual GPU. Additional applications on the virtual compute instance may use different application-specific virtual GPUs, and the application-specific virtual GPUs may vary in graphics processing capabilities based on the varying requirements of the applications.

In some embodiments, local-to-remote migration techniques may be used with the techniques for virtualized graphics processing described herein. A virtual compute instance may be provisioned with a local graphics processing unit (GPU) to provide graphics processing. The local GPU may be implemented using attached hardware or using emulation. Because the local GPU may provide only a low level of graphics processing capability, a virtual GPU may be attached to the virtual compute instance to provide improved graphics processing relative to the local GPU. The virtual GPU may be selected from a set of virtual GPUs (e.g., belonging to virtual GPU classes) having different capabilities for graphics processing. The virtual GPU may be implemented using a physical GPU that is connected to the virtual compute instance over a network. Graphics processing for the virtual compute instance may be migrated from the local GPU to the virtual GPU. In one embodiment, graphics processing for a particular application on the virtual compute instance may be migrated from the local GPU to the virtual GPU during execution of the application. In one embodiment, the migration of graphics processing may be performed based (at least in part) on detection of an increase in graphics workload.

Disaggregated Graphics Asset Delivery and Management

Figure 6A:
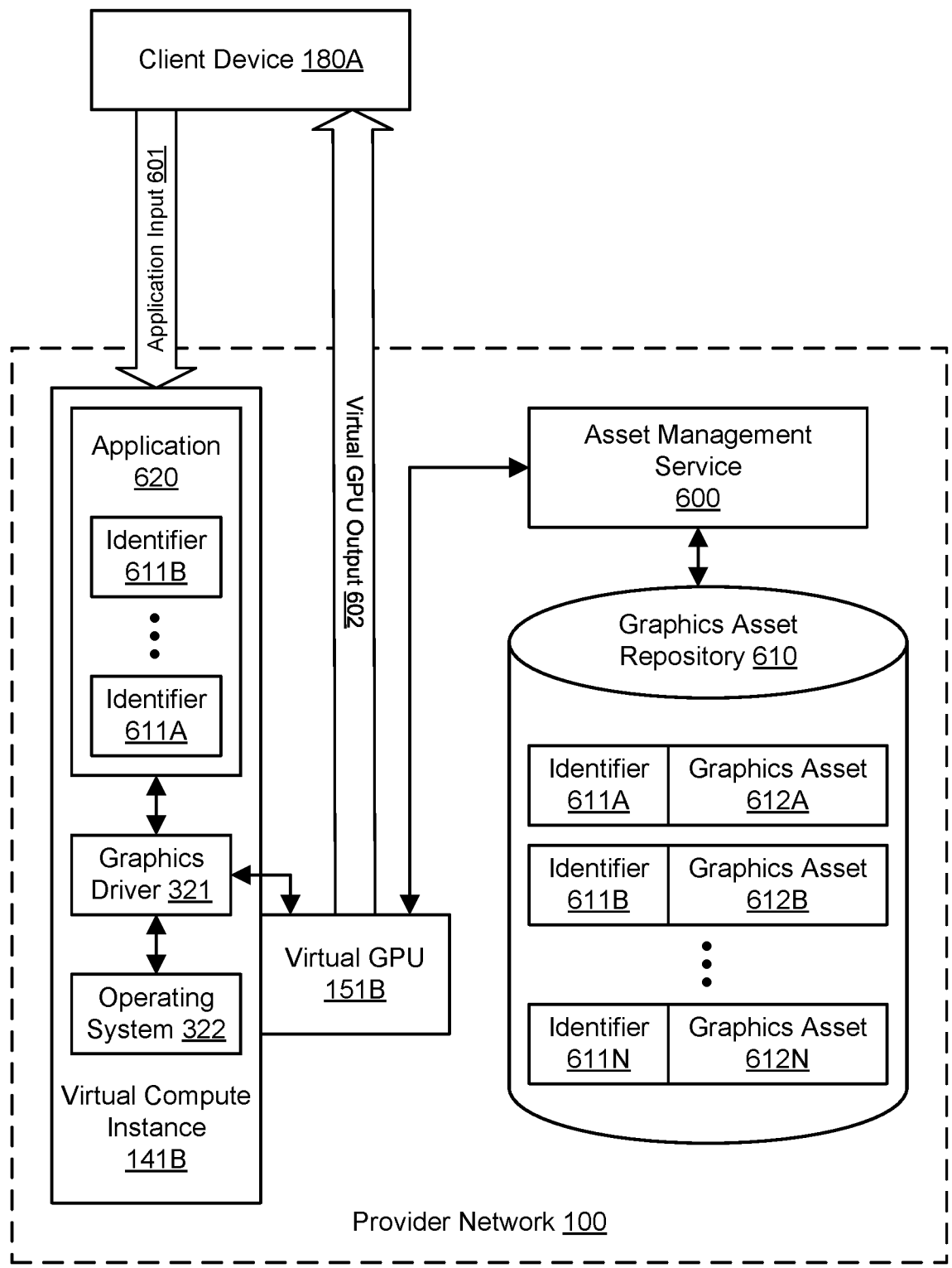
FIGS. 6A and 6B illustrate an example system environment for disaggregated graphics asset delivery for virtualized graphics processing, according to one embodiment.
Figure 6B:
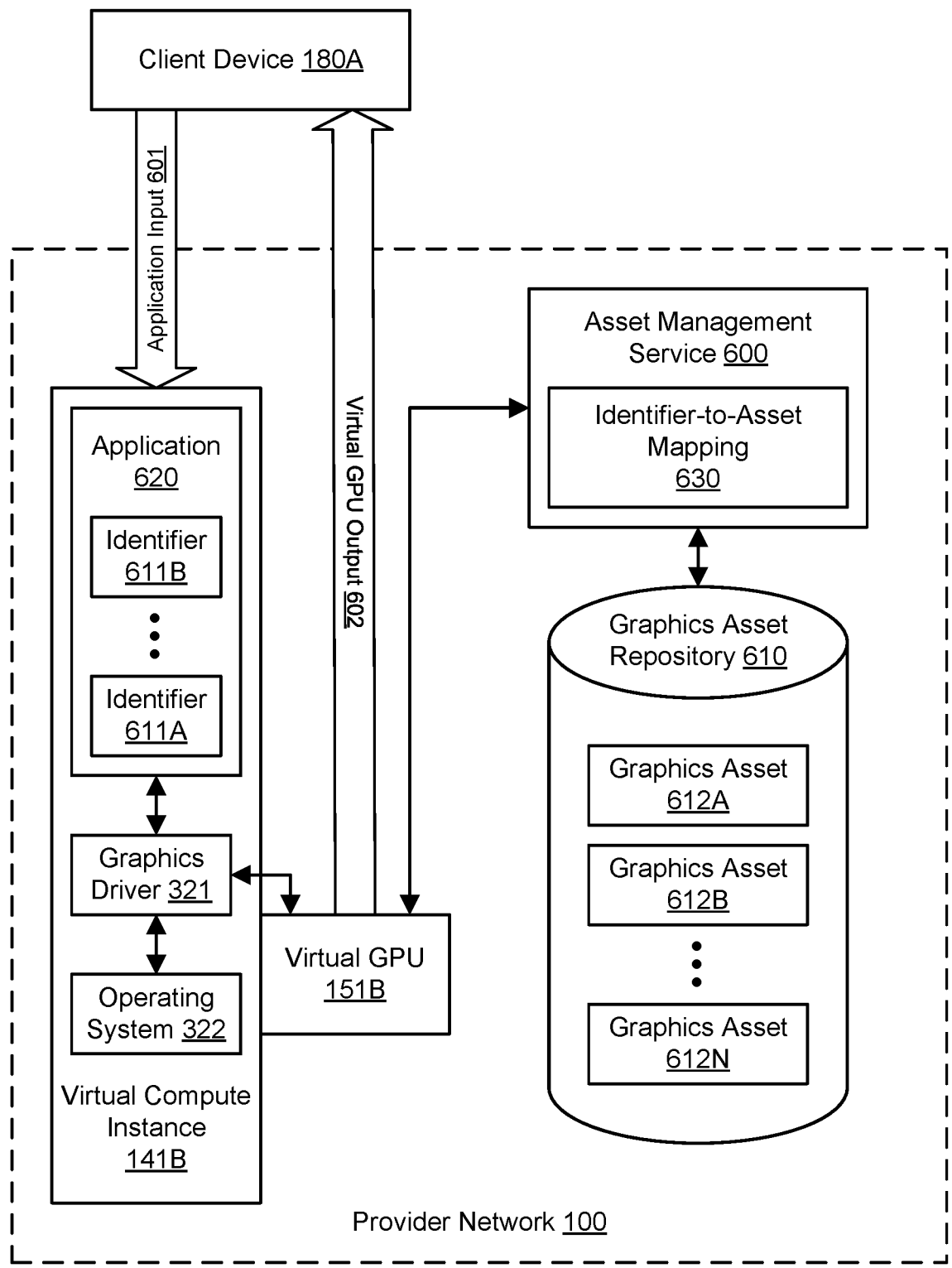

FIGS. 6A and 6B illustrate an example system environment for disaggregated graphics asset delivery for virtualized graphics processing, according to one embodiment. As discussed above with respect to FIG. 1 through FIG. 5, a virtual compute instance 141B may be provisioned with an attached virtual GPU 151B. After the virtual compute instance 141B is provisioned with the attached virtual GPU 151B, the client device 180A may use the provisioned instance and virtual GPU to perform any suitable tasks, e.g., based on input from the client device. The virtual compute instance 141B may execute a particular application 620. The application 620 may be selected or provided by the client. The virtual compute instance 141B may also be configured with a particular operating system 322 that provides support for the application 620. Additionally, the virtual compute instance 141B may be configured with a particular graphics driver 321. The graphics driver 321 may interact with the virtual GPU 151B to provide graphics processing for the application 620, including accelerated two-dimensional graphics processing and/or accelerated three-dimensional graphics processing. As discussed above, the graphics driver 321 may implement a graphics application programming interface (API) such as Direct3D or OpenGL. The graphics driver 321 may represent components running in user mode and/or kernel mode. Additional components (not shown), such as a graphics runtime, may also be used to provide accelerated graphics processing on the virtual compute instance 141B.

The client device 180A may provide application input 601 to the application 620 running on the virtual compute instance 141B, potentially through a proxy. For example, the application input 601 may include data to be operated upon by the application 620 and/or instructions to control the execution of the application. Using the graphics processing provided by the virtual GPU 151B, execution of the application 620 may generate virtual GPU output 602. The virtual GPU output 602 may be provided to the client device 180A, e.g., from the virtual GPU 151B or virtual compute instance 141B. In one embodiment, the virtual GPU output 602 may be sent from the virtual GPU 151B (e.g., from a computing device that includes the virtual GPU) to the client device 180A while bypassing the rest of the virtual compute instance 141B (e.g., the underlying physical compute instance 142B). The virtual GPU output 602 may also be sent to the client device 180A through a proxy. In one embodiment, the virtual GPU output 602 may be returned to the virtual compute instance 141B, and the virtual compute instance may send the virtual GPU output to the client device 180A. In one embodiment, the client device 180A may forward the virtual GPU output 602 to another component.

To reduce the amount of data transfer between the virtual compute instance 141B and the virtual GPU 151B, graphics assets may be referred to by compact identifiers in the application 620. Graphics assets may include any data usable by the virtual GPU to generate the virtual GPU output 602. For example, graphics assets may include textures, vertex buffers, index buffers, 3D models, or other elements of data for 2D or 3D graphics. As shown in the example of FIG. 6A, the application 620 may include various identifiers such as identifiers 611A and 611B. Any of the identifiers 611A or 611B may be repeated any suitable number of times in the code or data of the application 620. An identifier may represent a handle, a secure hash of all or part of the corresponding graphics asset, or any other suitable identifier that is typically smaller in size than the corresponding graphics asset itself. A handle may represent an abstract reference to a resource, such as a file descriptor for a graphics asset stored in a graphics asset repository. For example, a handle may be an opaque identifier such as an integer in an array index for a type of resource or a pointer that permits access to a resource. Each identifier may uniquely identify a corresponding graphics asset within some context. Execution of the application 620 may include execution of instructions on the virtual compute instance 141B (e.g., on the underlying physical compute instance 142B). Execution of the application 620 may include sending one or more graphics instructions from the virtual compute instance 141B to the virtual GPU 151B for execution on the virtual GPU (e.g., on the underlying physical GPU 152B). The graphics instruction(s) may be associated with one or more identifiers of one or more graphics assets, e.g., such that a particular graphics instruction may require a particular graphics asset as input. In executing the application 620, the virtual compute instance 141B may send the identifier(s) of the graphics asset(s) to the virtual GPU 151B rather than send the corresponding graphics asset(s) themselves. In one embodiment, the graphics assets themselves may not be distributed with the application 620 and may not be provided to the virtual compute instance 141B.

The graphics assets themselves may be obtained by the virtual GPU 151B using the identifiers. In one embodiment, the graphics assets may be obtained from a graphics asset repository 610. For example, the identifier 611A may correspond to a graphics asset 612A stored in the repository 610, and the identifier 611B may correspond to a graphics asset 612B stored in the repository. The repository 610 may also store additional graphics assets such as graphics asset 612N that corresponds to identifier 611N. The graphics asset repository 610 may be implemented using storage resources in the same multi-tenant provider network 100 as the computing resources that implement the virtual compute instance 141B and virtual GPU 151B. Any suitable storage services or subsystems may be used to implement the graphics asset repository 610. In one embodiment, the graphics asset repository 610 may include "buckets" in which items of data can be stored. In one embodiment, the graphics asset repository 610 may include a key-value data store from which graphics assets can be retrieved based on their identifiers as keys. In one embodiment, the graphics asset repository 610 may be implemented using disparate storage elements, e.g., as located throughout the provider network 100. In one embodiment, the repository 610 or a portion thereof may be positioned close to one or more virtual GPUs in the provider network 100 in order to reduce network latency for providing graphics assets to the one or more virtual GPUs.

An asset management service 600 may interact with the virtual GPU 151B and deliver the assets to the virtual GPU. In one embodiment, as shown in the example of FIG. 6A, the graphics assets 612A-612N may be stored with their identifiers 611A-611N in the repository 610, and the asset management service 600 may retrieve and return the corresponding graphics asset when it receives an identifier from the virtual GPU 151B. For example, the identifiers 611A-611N may represent keys in a key-value data store implemented by the repository 610. In one embodiment, as shown in the example of FIG. 6B, the asset management service 600 may map the identifiers to the assets using an identifier-to-asset mapping functionality 630. For example, the identifier-to-asset mapping functionality 630 may maintain a table that maps identifiers to the storage locations of the corresponding graphics assets, and when a request for a graphics asset is received from the virtual GPU 151B, the asset management service 600 may perform a lookup in the table to determine the storage location of the asset in the repository 610.

In one embodiment, a display device associated with the client device 180A may present a display of the virtual GPU output 602. In one embodiment, the virtual GPU output 602 may include pixel data, image data, video data, or other graphical data. In one embodiment, the virtual GPU output 602 may drive a full-screen display on the display device. Portions of the virtual GPU output 602 may be streamed to the client device 180A over time. In one embodiment, the virtual GPU output 602 may be composited with one or more other sources of graphical data to produce the display. In one embodiment, the virtual GPU 151B may be used for general-purpose computing (e.g., GPGPU computing), and the virtual GPU output 602 may not include pixel data or other graphical data. In various embodiments, the client device 180A may process or transform all or part of the virtual GPU output 602 before displaying the output. For example, a CPU, GPU, or co-processor on the client device 180A may transform portions of the virtual GPU output 602 and display the results on the display device.

Figure 7A:
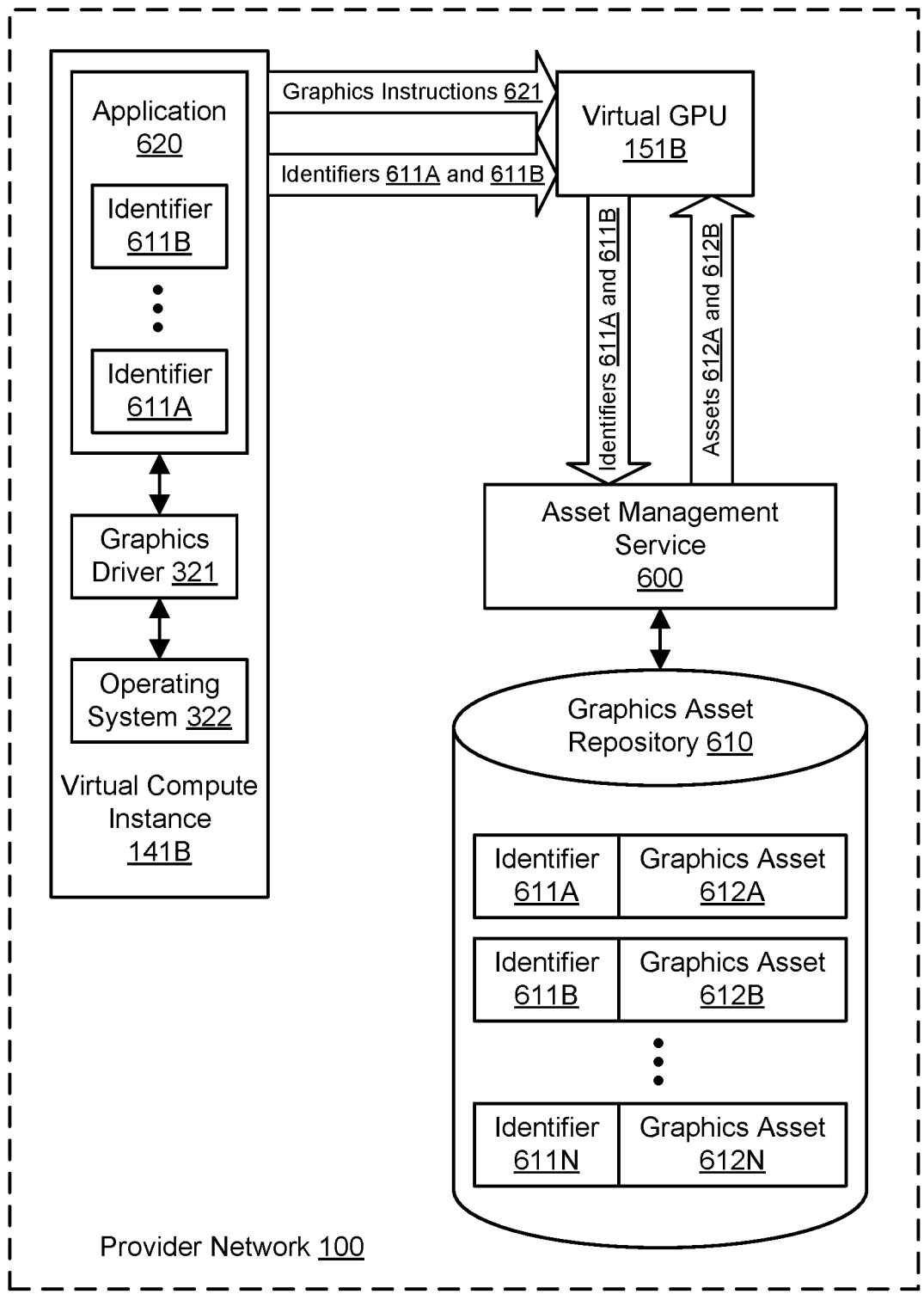
FIGS. 7A and 7B illustrate further aspects of the example system environment for disaggregated graphics asset delivery for virtualized graphics processing, including the use of an asset management service by a virtual GPU to retrieve graphics assets from a graphics asset repository, according to one embodiment.
Figure 7B:
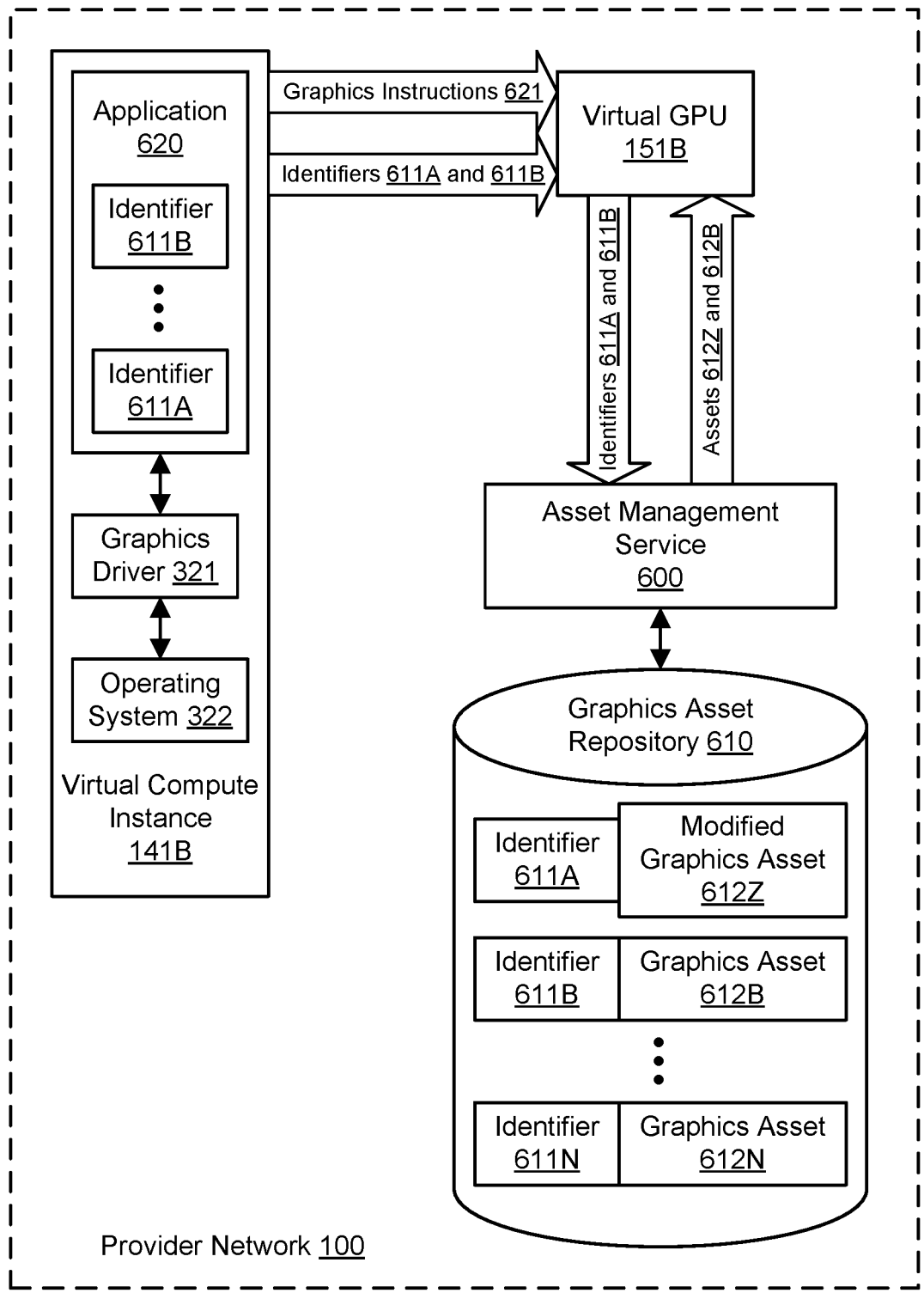

FIGS. 7A and 7B illustrate further aspects of the example system environment for disaggregated graphics asset delivery for virtualized graphics processing, including the use of an asset management service by a virtual GPU to retrieve graphics assets from a graphics asset repository, according to one embodiment. As discussed above, execution of the application 620 may include sending one or more graphics instructions 621 from the virtual compute instance 141B to the virtual GPU 151B for execution on the virtual GPU (e.g., on the underlying physical GPU 152B). The graphics instruction(s) 621 may be associated with one or more identifiers 611A and 611B of one or more graphics assets 612A and 612B, respectively, e.g., such that a particular graphics instruction may require a particular graphics asset as input. In executing the application 620, the virtual compute instance 141B may send the identifier(s) 611A and 611B of the graphics asset(s) 612A and 612B to the virtual GPU 151B rather than send the corresponding graphics asset(s) themselves.

To obtain graphics assets 612A and 612B corresponding to the identifiers 611A and 611B, the virtual GPU 151B may request the assets from the asset management service 600 by specifying the identifiers. The asset management service 600 may perform any appropriate mapping to determine the storage locations of the corresponding assets or may rely upon an association between the identifiers and the assets in the repository 610. For example, the repository 610 may represent a key-value data store in which graphics assets may be retrieved by specifying their identifiers. The asset management service 600 may then return the retrieved assets to the virtual GPU 151B or otherwise enable the virtual GPU 151B to retrieve the assets from the repository 610. The virtual GPU 151B may execute the graphics instructions 621 using the graphics assets 612A and 612B retrieved from the graphics asset repository 610.

In one embodiment, the virtual GPU 151B may request an asset when the graphics instruction that requires the asset (and references the corresponding compact identifier) is received from the virtual compute instance 141B. The transfer of the asset to the virtual GPU 151B may be performed efficiently due to the relative proximity of the virtual GPU and the repository 610 (or a portion thereof) in the provider network 100. In one embodiment, to further optimize performance, the virtual GPU 151B may pre-fetch a graphics asset before the instruction that requires the asset is received from the virtual compute instance 141B. Any suitable pre-fetching logic may be used in the virtual compute instance 141B, virtual GPU 151B, or asset management service 600 to anticipate when particular graphics assets are expected to be needed by the virtual GPU. For example, the asset management service 600 or another component in the provider network 100 may monitor requests for graphics assets to determine usage patterns. As an example of a usage pattern, a particular level of a game may include a set of graphics assets that is often encountered in a particular sequence. As another example, another service (not shown) may provide usage metrics of graphics assets to consumers such as the asset management service 600 in order to inform pre-fetching decisions. In one embodiment, the pre-fetching optimization may be configured per application, per developer, or according to some other context that includes particular graphics assets. Pre-fetching may also be assisted by a list of graphics assets provided by an application. The virtual GPU 151B may also include a cache for storing graphics assets and may use suitable caching logic to keep suitable graphics assets resident in the cache, e.g., with recently used and/or frequently used graphics assets. In such cases, the virtual GPU 151B may bypass the asset management service 600 when a graphics asset has previously been retrieved and is currently stored in the local cache.

In one embodiment, an original graphics asset in the repository 610 may be replaced with a modified graphics asset, and the identifier of the original graphics asset may be used to retrieve the modified graphics asset from the repository. As illustrated in the example of FIG. 7B, the graphics asset 612A has been replaced with the modified graphics asset 612Z. The modified asset 612Z may represent a different texture, vertex buffer, 3D model, or other set of graphics data than the original asset 612A. In one embodiment, the identifier-to-asset mapping functionality 630 may be updated accordingly. Although the original graphics asset 612A has been replaced, the application 620 still references the identifier 611A of the original asset 612A. When the virtual GPU 151B requests the graphics asset associated with the identifier 611A, the asset management service 600 may retrieve and return the modified graphics asset 612Z rather than the original asset 612A. In this manner, a graphics asset may be updated without the need to update program code in one or more applications that use that asset.

Figure 8:
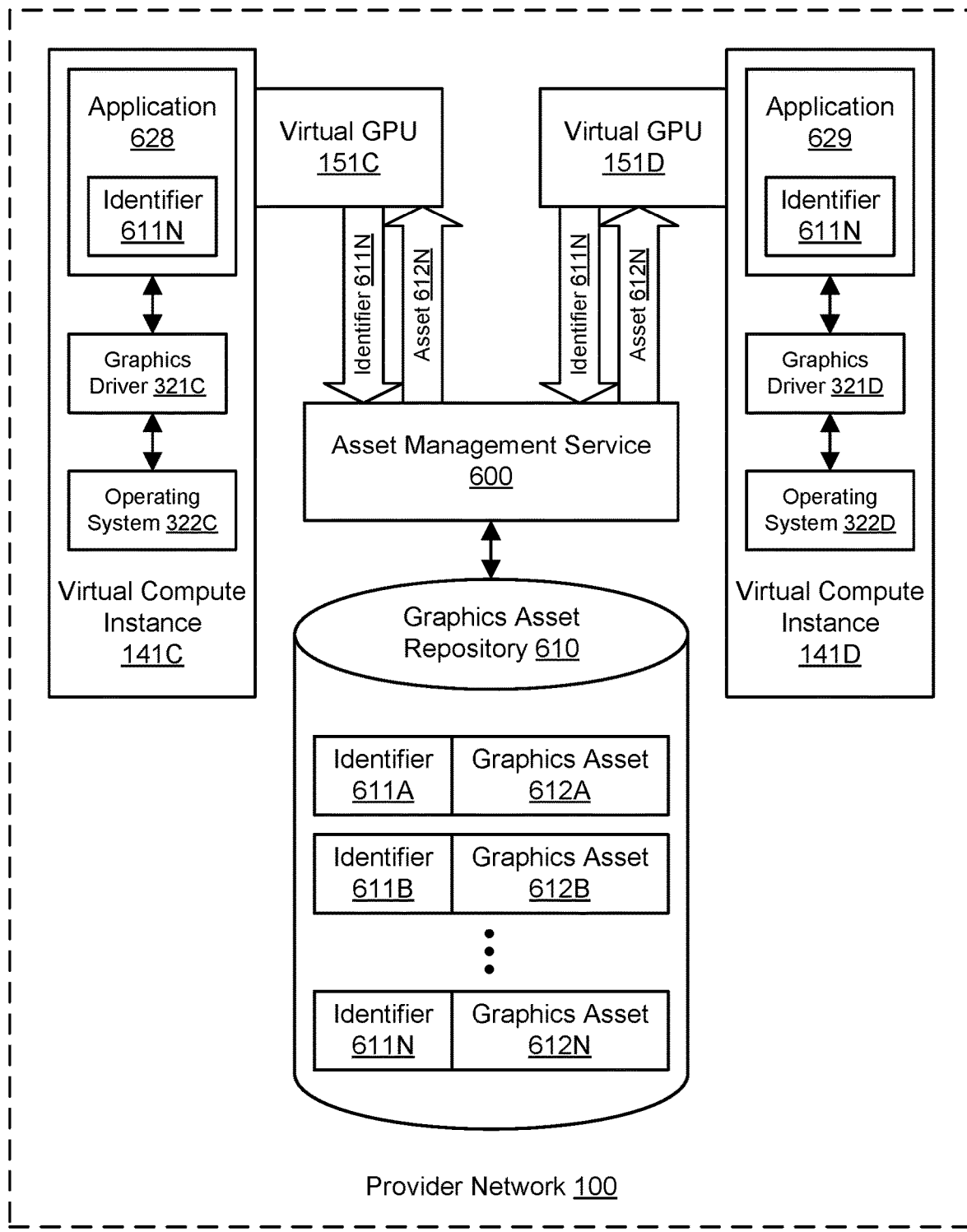
FIG. 8 illustrates further aspects of the example system environment for disaggregated graphics asset delivery for virtualized graphics processing, including the use of the same graphics asset by different applications and different virtual GPUs, according to one embodiment.

FIG. 8 illustrates further aspects of the example system environment for disaggregated graphics asset delivery for virtualized graphics processing, including the use of the same graphics asset by different applications and different virtual GPUs, according to one embodiment. Multiple applications or instances of the same application may refer to the same graphics asset in the repository, e.g., using the same compact identifier. As shown in the example of FIG. 8, a virtual compute instance 141C may be provisioned with an attached virtual GPU 151C. The virtual compute instance 141C may execute an application 628 and may also include a graphics driver 321C and an operating system 322C. As also shown in the example of FIG. 8, a different virtual compute instance 141D may be provisioned with an attached virtual GPU 151D. The virtual compute instance 141D may execute a different application 629 and may also include a graphics driver 321D and an operating system 322D. The virtual compute instances 141C-141D and/or their constituent elements (e.g., graphics drivers 321C-321D and operating systems 322C-322D) may differ in kind or configuration or may represent different instances of the same component. Similarly, the virtual GPUs 151C-151D may differ in kind or configuration or may represent different instances of the same component. Both applications 628 and 629 may include the same identifier 611N of the same graphics asset 612B, and both virtual GPUs 151C and 151D may accordingly obtain the same graphics asset 612B for execution of graphics instructions. In a similar manner, different instances of the same application executing on different virtual compute instances may also refer to the same graphics asset by its identifier. In one embodiment, multiple applications may refer to the same graphics asset by its identifier only if the access restrictions for the asset permit such access. Access restrictions for graphics assets are discussed below with respect to FIG. 10 through FIG. 12.

Figure 9:
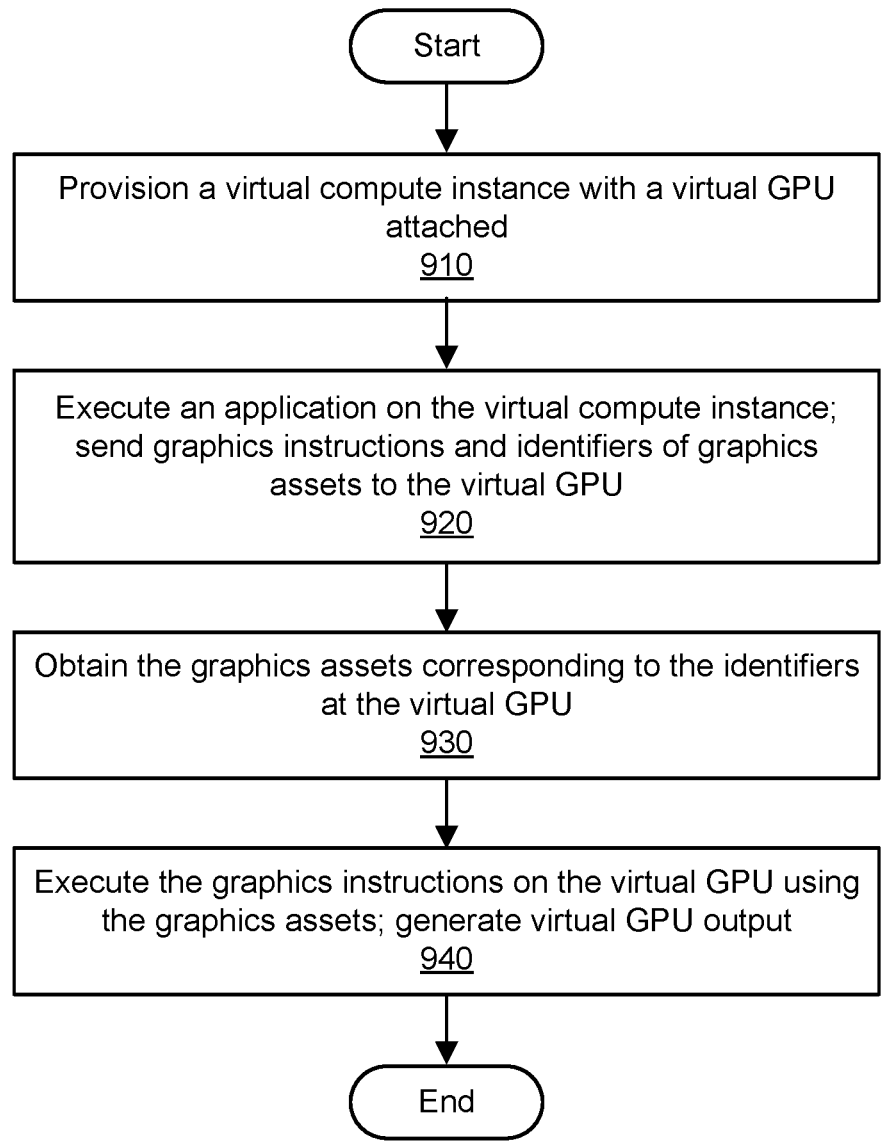
FIG. 9 is a flowchart illustrating a method for providing disaggregated graphics asset delivery for virtualized graphics processing, according to one embodiment.

FIG. 9 is a flowchart illustrating a method for providing disaggregated graphics asset delivery for virtualized graphics processing, according to one embodiment. As shown in 910, a virtual compute instance may be provisioned with an attached virtual GPU. The virtual compute instance may be selected based (at least in part) on computational and memory resources provided by the virtual compute instance. For example, the virtual compute instance may be selected based (at least in part) on a selection of an instance type by a user. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU. The elastic graphics service may interact with one or more other services or functionalities of a provider network, such as a compute virtualization functionality and/or GPU virtualization functionality, to provision the instance with the virtual GPU.

The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

As shown in 920, an application may be executed on the virtual compute instance using virtualized graphics processing provided by the virtual GPU. To reduce the amount of data transfer between the virtual compute instance and the virtual GPU, graphics assets (e.g., textures, vertex buffers, 3D models, and so on) may be referred to by compact identifiers in the application. The identifiers may represent handles and/or secure hashes. Execution of the application may include execution of instructions on the virtual compute instance (e.g., on the underlying physical compute instance). Execution of the application may include sending one or more graphics instructions from the virtual compute instance to the virtual GPU for execution on the virtual GPU (e.g., on the underlying physical GPU). The graphics instruction(s) may be associated with one or more identifiers of one or more graphics assets, e.g., such that a particular graphics instruction may require a particular graphics asset as input. In executing the application, the virtual compute instance may send the identifier(s) of the graphics asset(s) to the virtual GPU rather than send the corresponding graphics asset(s) themselves. In one embodiment, the graphics assets may not be distributed with the application and may not be provided to the virtual compute instance.

As shown in 930, the virtual GPU may obtain the graphics asset(s) corresponding to the identifier(s). Graphics assets may be stored in a graphics asset repository. The graphics asset(s) may be obtained by the virtual GPU from the graphics asset repository using the identifier(s). An asset management service called by the virtual GPU may map the identifier(s) to the asset(s) and deliver the asset(s) to the virtual GPU. The graphics asset repository may be implemented in the same multi-tenant provider network as the virtual compute instance and virtual GPU. In one embodiment, the repository or a portion thereof may be positioned close to one or more virtual GPUs in the provider network in order to minimize network latency. Caching and/or prefetching of graphics assets may be used at the virtual GPU for performance optimization, e.g., such that a particular asset may be stored at the virtual GPU before a graphics instruction that requires it is received. Multiple applications or instances of the same application may refer to the same graphics asset in the repository, e.g., using the same compact identifier. Particular graphics assets may be associated with access restrictions to limit their availability to particular accounts, organizations, users, user groups, or applications, or graphics assets may instead be globally accessible. In one embodiment, an original graphics asset in the repository may be replaced with a modified graphics asset, and the identifier of the original graphics asset may be used to retrieve the modified graphics asset from the repository. In this manner, a graphics asset may be updated without the need to update program code in one or more applications that use that asset.

As shown in 940, the virtual GPU may execute graphics instructions using the graphics asset(s) retrieved from the graphics asset repository. Execution of the graphics instructions using the virtual GPU may generate virtual GPU output, e.g., output produced by executing instructions or otherwise performing tasks on the virtual GPU. The virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device.

Figure 10:
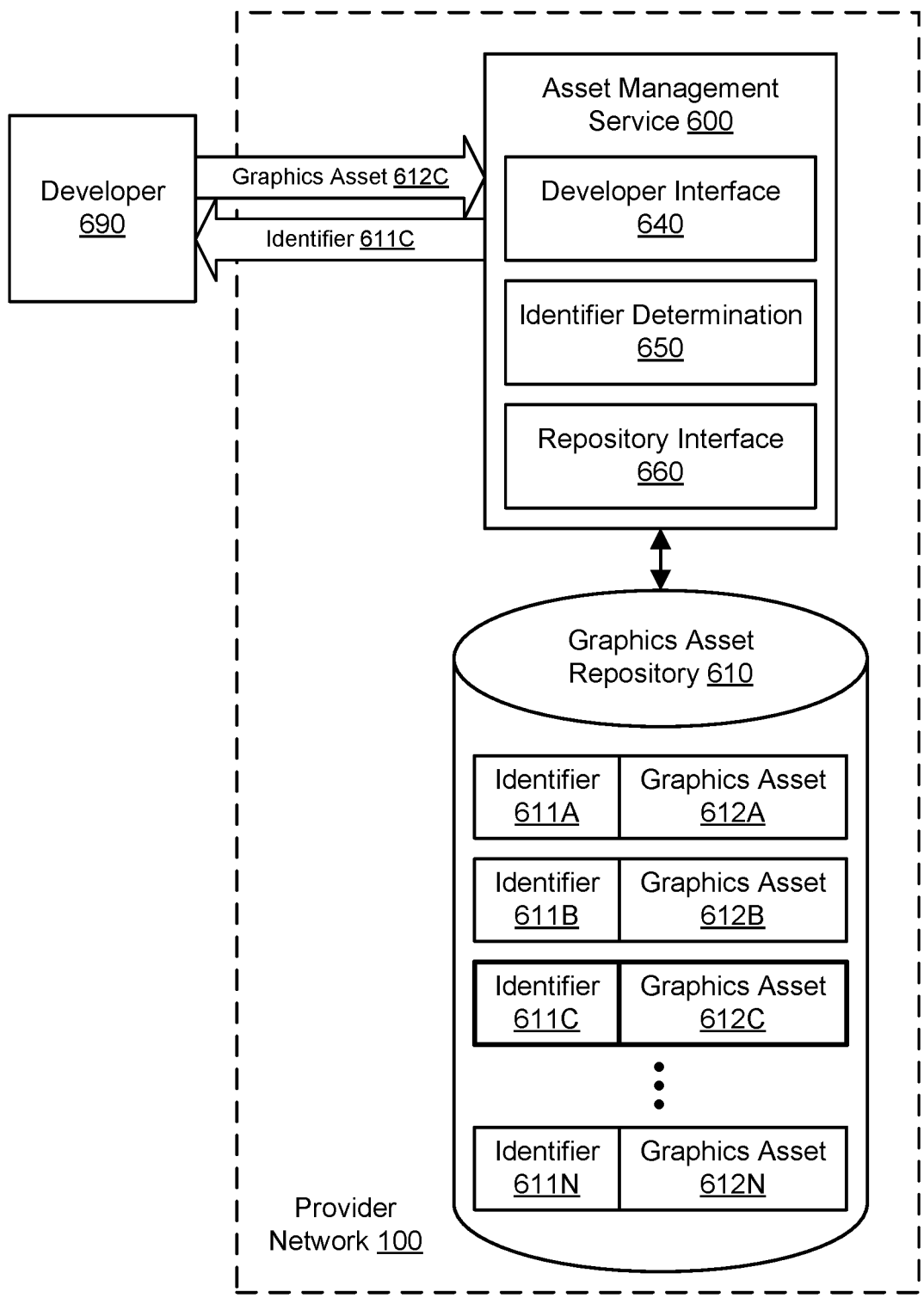
FIG. 10 illustrates registration of a graphics asset with an asset management service, according to one embodiment.

FIG. 10 illustrates registration of a graphics asset with an asset management service, according to one embodiment. Developers may manage their graphics assets using the asset management service 600. As shown in the example of FIG. 10, a developer 690 may register a graphics asset 612C with the asset management service 600. The developer 690 may represent an individual user, user group, account, or organization associated with a creator of software that seeks to take advantage of the disaggregated graphics asset delivery described herein. The developer 690 may represent software associated with the developer that is executed based (at least in part) on input from an end user. The asset management service 600 may include a developer interface 640 for interacting with developers (e.g., with software associated with developers). The developer interface 640 may include any suitable programmatic interface(s) (e.g., one or more application programming interfaces) and/or any suitable user interfaces (e.g., a graphical user interface displayable in a browser program through which developers can add graphics asset and brows the repository 610). The developer 690 may seek to register a graphics asset 612C with the asset management service 600. In one embodiment, the registration may be performed as part of a software development pipeline. For example, the developer may seek to register a 3D model of an object to be displayed in software under development. In one embodiment, the registration may be performed based (at least in part) on input from an end user of software produced or distributed by the developer. For example, an end user may provide user input to the developer's software to create a graphics asset such as an avatar that is specific to that user.

When the developer 690 registers the graphics asset 612C with the asset management service 600, the asset management service may use an identifier determination functionality 650 to determine an identifier 611C corresponding to the asset. The identifier 611C may represent a handle, a secure hash of all or part of the corresponding graphics asset 612C, or any other suitable identifier that is typically smaller in size than the corresponding graphics asset itself. The asset management service 600 may then return the identifier 611C to the developer 690 for inclusion in any suitable application by that developer instead of the corresponding graphics asset 612C. As discussed above, when the identifier 611C is sent to a virtual GPU in execution of a program from the developer 690, the asset management service may retrieve the corresponding asset 612C for use by the virtual GPU.

The asset management service 600 may also include a repository interface 660 configured for interacting with the repository. Using the repository interface 660, the asset management service 600 may store the asset 612C in the repository 612C. In one embodiment, the asset 612C may be stored with its identifier 611C, e.g., in an appropriate data structure or in a key-value data store where the identifier represents the key and the asset represents the value. In one embodiment, the asset management service 600 may update a mapping of identifiers to assets when registering the asset 612C.

Figure 11:
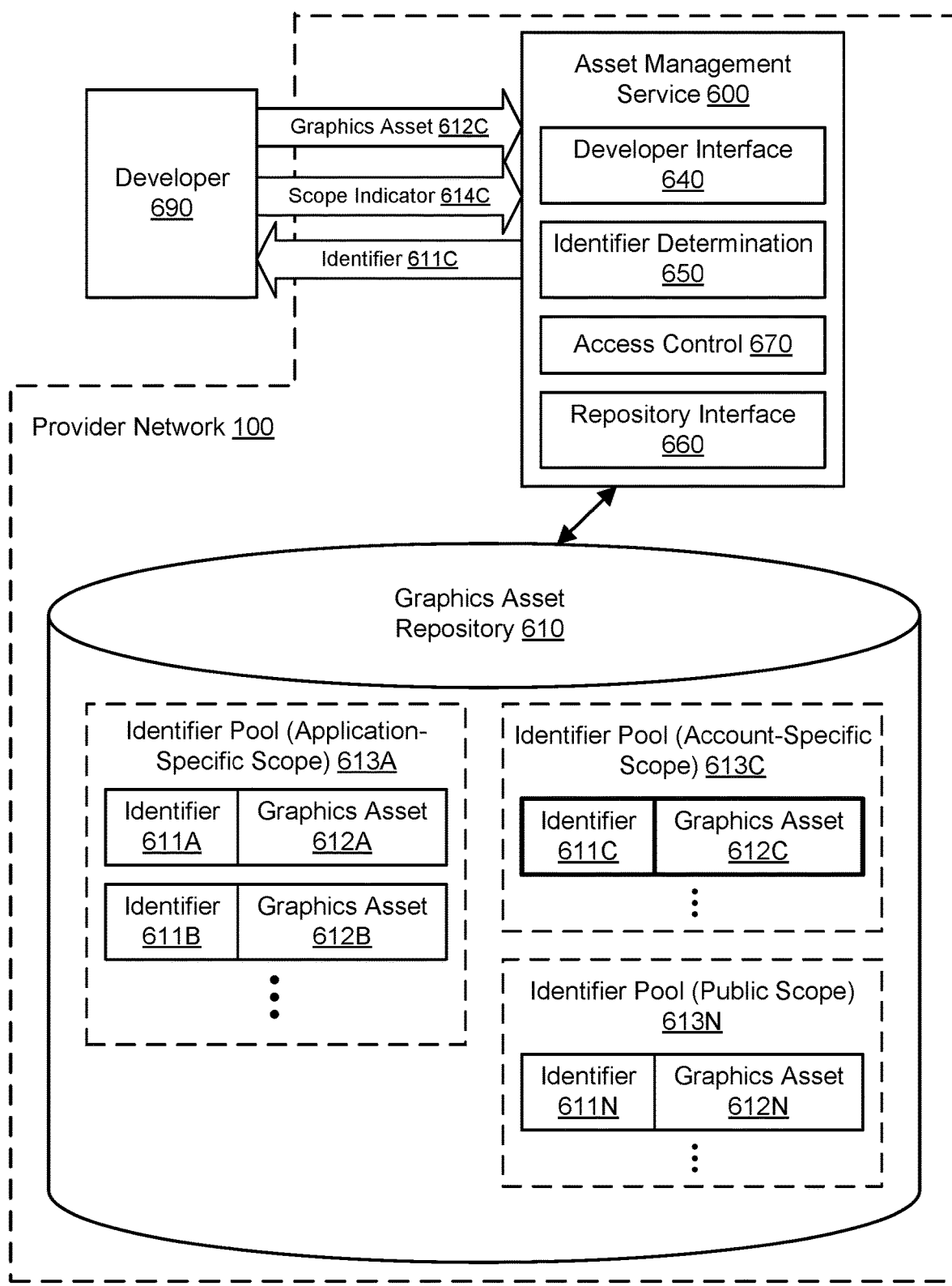
FIG. 11 illustrates registration of a graphics asset in an identifier pool having a particular asset scope, according to one embodiment.

FIG. 11 illustrates registration of a graphics asset in an identifier pool having a particular asset scope, according to one embodiment. Some graphics assets may be associated with access restrictions to limit their availability only to particular accounts, organizations, users, user groups, applications, or other desired access scopes. Some graphics assets may instead be globally accessible. Different pools of identifiers may be scoped to different sets of users, accounts, organizations, or applications according to the access restrictions. As shown in the example of FIG. 11, the repository 610 may include an identifier pool 613A that is accessible (e.g., read-accessible) only by a particular application. The identifier pool 613A may include identifier 611A of graphics asset 612A, identifier 611B of graphics asset 612B, and potentially other identifiers of graphics assets. The repository 610 may also include an identifier pool 613C that is accessible (e.g., read-accessible) only by a particular account associated with one or more users or groups of users. Additionally, the repository 610 may also include an identifier pool 613N that is globally accessible (e.g., read-accessible) and that may include the graphics asset 612N. The write permissions for any of the identifier pools may differ from the read permissions, e.g., such that only a limited set of users may write or modify the corresponding graphics assets. The same application may refer to identifiers from pools of different access scope, such as the application-specific pool 613A and the global pool 613N.

When registering a graphics asset, a developer may provide a scope indicator 614C of any desired access restrictions. For example, the scope indicator 614C may indicate that read access should be limited to one or more particular accounts, organizations, users, user groups, applications, or other desired access scopes. Using the scope indicator 614C, the asset management service 600 may place the asset 612C in an appropriate identifier pool, such as the account-specific identifier pool 613C. Alternatively, a developer 690 may manually select an identifier pool having the desired access scope when registering a graphics asset 612C. In one embodiment, a developer 690 may select an existing identifier pool or create a new identifier pool to represent a new access scope.

Using the access control functionality 670, the asset management service may determine whether a requesting entity (e.g., a developer or virtual GPU) is approved for access (e.g., read access) for a particular graphics asset. If the access is approved, then the asset management service 600 may retrieve and return the requested asset. If the access is not approved, then the asset management service 600 may deny access and return an error indicator.

The contents of an identifier pool may be queried by a developer who has appropriate access, and the asset management service may return data indicative of those contents. The returned data may be displayed in a user interface and may include, for example, lists of descriptions or names of the graphics assets, thumbnails or other reduced versions of the graphics assets, links to obtain the full graphics assets, and so on. The access control functionality 670 may ensure that access restrictions for identifier pools are observed when queries are performed.

Figure 12:
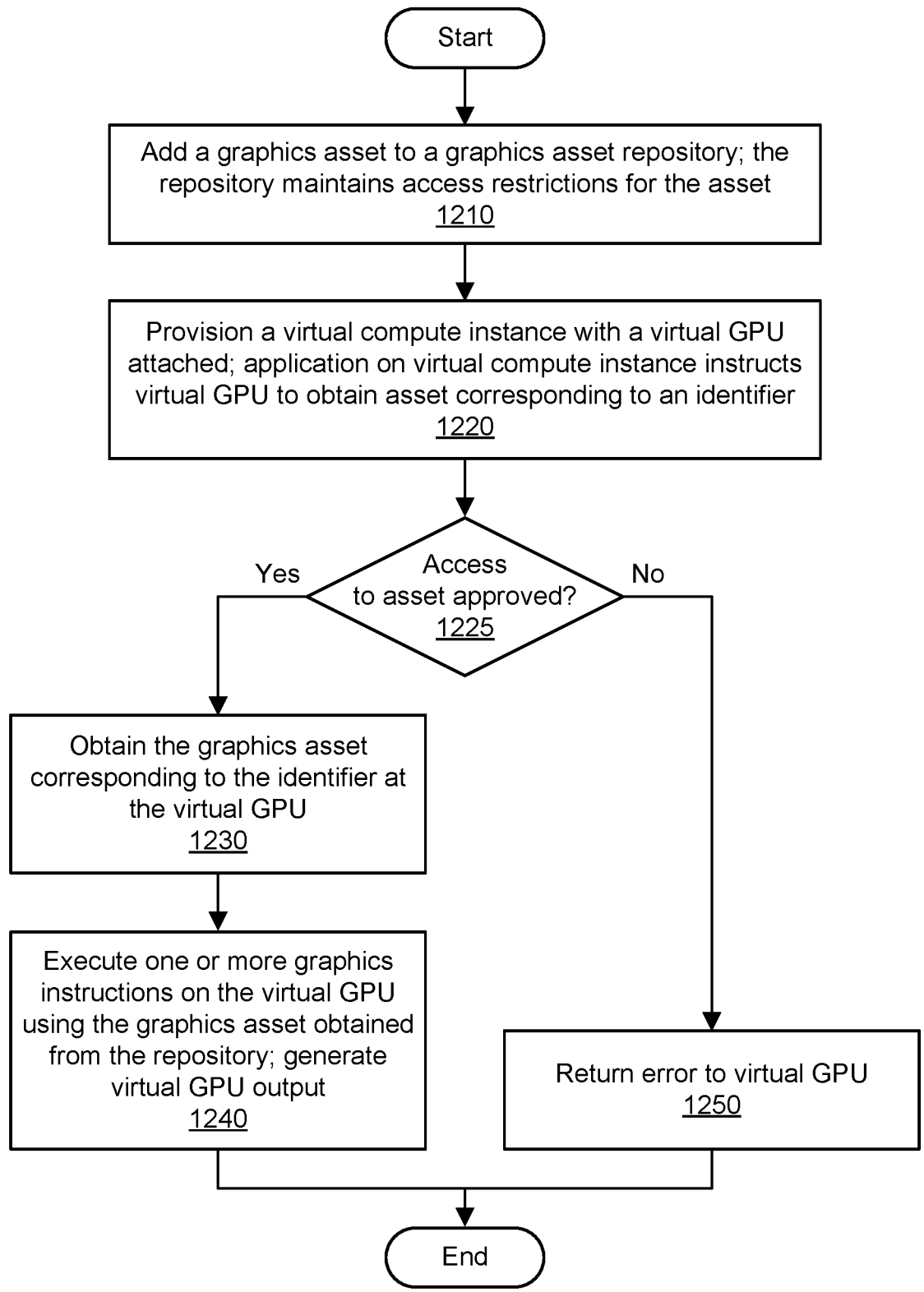
FIG. 12 is a flowchart illustrating a method for providing disaggregated graphics asset management for virtualized graphics processing, according to one embodiment.

FIG. 12 is a flowchart illustrating a method for providing disaggregated graphics asset management for virtualized graphics processing, according to one embodiment. As shown in 1210, a graphics asset (e.g., a texture, vertex buffer, 3D model, and so on) may be added to a graphics asset repository for storage. The graphics asset may be associated with a compact identifier (e.g., a handle or secure hash) in the repository. The graphics asset repository may be implemented using storage resources in a multi-tenant provider network with the computing resources used to implement one or more virtual compute instances and one or more virtual GPUs. In one embodiment, the repository or a portion thereof may be positioned close to one or more virtual GPUs in the provider network in order to minimize network latency. Multiple applications or instances of the same application may refer to the same graphics asset in the repository, e.g., using the same compact identifier. Particular graphics assets may be associated with access restrictions to limit their availability to particular accounts, organizations, users, user groups, or applications, or graphics assets may instead be globally accessible. In one embodiment, an original graphics asset in the repository may be replaced with a modified graphics asset, and the identifier of the original graphics asset may be used to retrieve the modified graphics asset from the repository. In this manner, a graphics asset may be updated without the need to update program code in one or more applications that use that asset.

Developers may manage their graphics assets using an interface to the repository, e.g., as provided by an asset management service. When a developer registers a graphics asset with the asset management service, the asset management service may determine an identifier corresponding to the asset (e.g., representing a handle or secure hash), store the asset in the repository using an association with the corresponding identifier, and return the identifier so that the corresponding graphics asset may be referenced in an application. Some graphics assets may be associated with access restrictions to limit their availability to particular accounts, organizations, users, user groups, applications, or other desired access scopes. Some graphics assets may instead be globally accessible. Different pools of identifiers may be scoped to different sets of users, accounts, organizations, or applications according to the access restrictions. When registering a graphics asset, a developer may provide an indicator of any access restrictions such that the asset management service may place the asset in an appropriate identifier pool, or a developer may select a pool having the desired access scope. The contents of an identifier pool may be queried by a developer who has appropriate access, and the asset management service may return data indicative of those contents (e.g., lists of descriptions or names of the graphics assets, thumbnails or other reduced versions of the graphics assets, links to obtain the full graphics assets, and so on).

As shown in 1220, a virtual compute instance may be provisioned with an attached virtual GPU. The virtual compute instance may be selected based (at least in part) on computational and memory resources provided by the virtual compute instance. For example, the virtual compute instance may be selected based (at least in part) on a selection of an instance type by a user. The virtual GPU may be selected based (at least in part) on graphics processing capabilities provided by the virtual GPU. For example, the virtual GPU may be selected based (at least in part) on a selection of a virtual GPU class by a user. The virtual compute instance and virtual GPU may also be selected based (at least in part) on availability of resources in a resource pool of a provider network that manages such resources. In one embodiment, an elastic graphics service may receive the specifications for and/or selections of the virtual compute instance and virtual GPU. The elastic graphics service may interact with one or more other services or functionalities of a provider network, such as a compute virtualization functionality and/or GPU virtualization functionality, to provision the instance with the virtual GPU.

The virtual compute instance may be implemented using central processing unit (CPU) resources and memory resources of a physical compute instance. The virtual GPU may be implemented using a physical GPU. The physical GPU may be attached to a different computing device than the computing device that provides the CPU resources for the virtual compute instance. The physical GPU may be accessible to the physical compute instance over a network. The virtual GPU may be said to be attached to the virtual compute instance, or the virtual compute instance may be said to include the virtual GPU. In one embodiment, the physical GPU may be shared between the virtual GPU and one or more additional virtual GPUs, and the additional virtual GPUs may be attached to additional virtual compute instances. In one embodiment, the virtual GPU may be accessible to the virtual compute instance via an interface device that includes a network interface and a custom hardware interface. Via the custom hardware interface, the interface device may emulate a GPU and appear to the virtual compute instance to include the virtual GPU. Via the network interface, the interface device may communicate with the physical GPU over the network.

An application may be executed on the virtual compute instance using virtualized graphics processing provided by the virtual GPU. To reduce the amount of data transfer between the virtual compute instance and the virtual GPU, graphics assets may be referred to by their compact identifiers in the application. The identifiers may represent handles and/or secure hashes. Execution of the application may include execution of instructions on the virtual compute instance (e.g., on the underlying physical compute instance). Execution of the application may include sending one or more graphics instructions from the virtual compute instance to the virtual GPU for execution on the virtual GPU (e.g., on the underlying physical GPU). The graphics instruction(s) may be associated with the identifiers of a graphics asset, e.g., such that a particular graphics instruction may require a particular graphics asset as input. In executing the application, the virtual compute instance may send the identifier of the graphics asset to the virtual GPU rather than send the corresponding graphics asset itself. In one embodiment, the graphics asset may not be distributed with the application and may not be provided to the virtual compute instance.

As shown in 1225, it may be determined whether access to the graphics asset is approved for the virtual GPU. An asset management service and/or graphics asset repository may enforce the access restrictions discussed above to allow or deny access requests for particular graphics assets. If access is not approved, then as shown in 1250, an error may be returned (e.g., by the asset management service and/or graphics asset repository) to the virtual GPU; the error may potentially be propagated to the application as well. If access is approved, then as shown in 1230, the virtual GPU may obtain the graphics asset corresponding to the identifier. The graphics asset may be obtained by the virtual GPU from the graphics asset repository using the identifier. The asset management service called by the virtual GPU may map the identifier to the asset and deliver the asset to the virtual GPU. Caching and/or pre-fetching of graphics assets may be used at the virtual GPU for performance optimization, e.g., such that a particular asset may be stored at the virtual GPU before a graphics instruction that requires it is received.

As shown in 1240, the virtual GPU may execute graphics instructions using the graphics asset retrieved from the graphics asset repository. Execution of the graphics instructions using the virtual GPU may generate virtual GPU output, e.g., output produced by executing instructions or otherwise performing tasks on the virtual GPU. The virtual GPU output may be provided to a client device. The virtual GPU output may be provided to the client device from the virtual compute instance or virtual GPU. In one embodiment, the virtual GPU output may be displayed on a display device associated with the client device. The virtual GPU output may include pixel information or other graphical data that is displayed on the display device.

Illustrative Computer System

In at least some embodiments, a computer system that implements a portion or all of one or more of the technologies described herein may include a computer system that includes or is configured to access one or more computer-readable media. FIG. 13 illustrates such a computing device 3000. In the illustrated embodiment, computing device 3000 includes one or more processors 3010 coupled to a system memory 3020 via an input/output (I/O) interface 3030. Computing device 3000 further includes a network interface 3040 coupled to I/O interface 3030.

In various embodiments, computing device 3000 may be a uniprocessor system including one processor 3010 or a multiprocessor system including several processors 3010 (e.g., two, four, eight, or another suitable number). Processors 3010 may include any suitable processors capable of executing instructions. For example, in various embodiments, processors 3010 may be processors implementing any of a variety of instruction set architectures (ISAs), such as the x86, PowerPC, SPARC, or MIPS ISAs, or any other suitable ISA. In multiprocessor systems, each of processors 3010 may commonly, but not necessarily, implement the same ISA.

System memory 3020 may be configured to store program instructions and data accessible by processor(s) 3010. In various embodiments, system memory 3020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 3020 as code (i.e., program instructions) 3025 and data 3026.

In one embodiment, I/O interface 3030 may be configured to coordinate I/O traffic between processor 3010, system memory 3020, and any peripheral devices in the device, including network interface 3040 or other peripheral interfaces. In some embodiments, I/O interface 3030 may perform any necessary protocol, timing or other data transformations to convert data signals from one component (e.g., system memory 3020) into a format suitable for use by another component (e.g., processor 3010). In some embodiments, I/O interface 3030 may include support for devices attached through various types of peripheral buses, such as a variant of the Peripheral Component Interconnect (PCI) bus standard or the Universal Serial Bus (USB) standard, for example. In some embodiments, the function of I/O interface 3030 may be split into two or more separate components, such as a north bridge and a south bridge, for example. Also, in some embodiments some or all of the functionality of I/O interface 3030, such as an interface to system memory 3020, may be incorporated directly into processor 3010.

Network interface 3040 may be configured to allow data to be exchanged between computing device 3000 and other devices 3060 attached to a network or networks 3050. In various embodiments, network interface 3040 may support communication via any suitable wired or wireless general data networks, such as types of Ethernet network, for example. Additionally, network interface 3040 may support communication via telecommunications/telephony networks such as analog voice networks or digital fiber communications networks, via storage area networks such as Fibre Channel SANs, or via any other suitable type of network and/or protocol.

In some embodiments, system memory 3020 may be one embodiment of a computer-readable (i.e., computer-accessible) medium configured to store program instructions and data as described above for implementing embodiments of the corresponding methods and apparatus. However, in other embodiments, program instructions and/or data may be received, sent or stored upon different types of computer-readable media. Generally speaking, a computer-readable medium may include non-transitory storage media or memory media such as magnetic or optical media, e.g., disk or DVD/CD coupled to computing device 3000 via I/O interface 3030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computing device 3000 as system memory 3020 or another type of memory. Further, a computer-readable medium may include transmission media or signals such as electrical, electromagnetic, or digital signals, conveyed via a communication medium such as a network and/or a wireless link, such as may be implemented via network interface 3040. Portions or all of multiple computing devices such as that illustrated in FIG. 13 may be used to implement the described functionality in various embodiments; for example, software components running on a variety of different devices and servers may collaborate to provide the functionality. In some embodiments, portions of the described functionality may be implemented using storage devices, network devices, or various types of computer systems. The term "computing device," as used herein, refers to at least all these types of devices, and is not limited to these types of devices.

The various methods as illustrated in the Figures and described herein represent examples of embodiments of methods. The methods may be implemented in software, hardware, or a combination thereof. In various ones of the methods, the order of the steps may be changed, and various elements may be added, reordered, combined, omitted, modified, etc. Various ones of the steps may be performed automatically (e.g., without being directly prompted by user input) and/or programmatically (e.g., according to program instructions).

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

It will also be understood that, although the terms first, second, etc., may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

Numerous specific details are set forth herein to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter. Various modifications and changes may be made as would be obvious to a person skilled in the art having the benefit of this disclosure. It is intended to embrace all such modifications and changes and, accordingly, the above description is to be regarded in an illustrative rather than a restrictive sense.

What is claimed is:

1. A system, comprising:
    a graphics asset repository; and
    one or more computing devices configured to implement an asset management service, wherein the asset management service is configured to:
        store in the graphics asset repository a graphics asset and respective indicators of one or more access restrictions for the graphics asset, wherein the graphics asset comprises one or both of a set of vertices and a texture;
        provide to an application a corresponding identifier for the stored graphics asset;
        receive a request from a virtual graphics processing unit (GPU) for the graphics asset identified by the corresponding identifier, wherein the virtual GPU executes graphics instructions on behalf of the application, and wherein the corresponding identifier is associated with the graphics instructions; and
        determine, based at least in part on the indicators of the one or more access restrictions for the graphics asset, that the virtual GPU is approved to access the graphics asset, and responsive to the determination:
            obtain the graphics asset from the graphics asset repository; and
            return the graphics asset associated with the corresponding identifier to the virtual GPU.

2. The system as recited in claim 1, wherein to store in the graphics asset repository the graphics asset and the respective indicators of one or more access restrictions for the graphics asset, the asset management service is further configured to:
    receive the graphics asset and the indicators of one or more access restrictions for the graphics asset;
    determine an identifier corresponding to the graphics asset, wherein the identifier belongs to one or more identifier pools, and wherein the one or more identifier pools are associated with the one or more access restrictions;
    store the graphics asset in the graphics asset repository; and
    return the identifier corresponding to the graphics asset.

3. The system as recited in claim 1, wherein the graphics asset is pre-fetched by the virtual GPU from the graphics asset repository prior to receipt by the virtual GPU of one or more graphics instructions associated with the identifier.

4. A computer-implemented method, comprising:
    storing in a graphics asset repository a graphics asset and respective indicators of one or more access restrictions for the asset, wherein the graphics asset comprises one or both of a set of vertices and a texture;
    providing to an application a corresponding identifier for the stored graphics asset
    receiving a request from a virtual graphics processing unit (GPU) for the graphics asset identified by the corresponding identifier, wherein the virtual GPU executes graphics instructions on behalf of the application, and wherein the corresponding identifier is associated with the graphics instructions; and
    determining, based at least in part on the indicators of one or more access restrictions of the graphics asset, that the virtual GPU is approved to access the graphics asset; and responsive to the determination:
        obtaining the graphics asset from the graphics asset repository; and
        returning the graphics asset associated with the one or more corresponding identifiers to the virtual GPU.

5. The method as recited in claim 4, wherein the graphics asset is associated with corresponding access restrictions in the graphics asset repository, wherein the access restrictions for the graphics asset indicate global access, access only by a particular account or organization, or access only by a particular application.

6. The method as recited in claim 4, further comprising:
    receiving a query indicative of an identifier pool in the graphics asset repository;
    determining access to the identifier pool in the query; and
    returning, from the asset management service, data indicative of the graphics asset in the identifier pool in the query.

7. The method as recited in claim 4, wherein the graphics asset repository is implemented using one or more storage resources of a multi-tenant provider network.

8. The method as recited in claim 4, wherein the graphics asset is pre-fetched by the virtual GPU from the graphics asset repository prior to receipt by the virtual GPU of one or more graphics instructions associated with the identifier of the graphics asset.

9. The method as recited in claim 4, further comprising:
    executing an application on a virtual compute instance, wherein the application comprises the identifier corresponding to the graphics asset, and wherein executing the application comprises sending one or more graphics instructions and the identifier from the virtual compute instance to the virtual GPU.

10. The method as recited in claim 4, wherein the graphics asset is cached by the virtual GPU prior to receipt by the virtual GPU of one or more graphics instructions associated with the identifier of the graphics asset.

11. The method as recited in claim 4, wherein the graphics asset is replaced in the graphics asset repository with a modified graphics asset, and wherein an identifier of the graphics asset is usable to retrieve the modified graphics asset.

12. A non-transitory computer-readable storage medium storing program instructions computer-executable to perform:
    storing in a graphics asset repository a graphics asset and respective indicators of one or more access restrictions for the asset, wherein the graphics asset comprises one or both of a set of vertices and a texture;

providing to an application a corresponding identifier for the stored graphics asset;

receiving a request from a virtual graphics processing unit (GPU) for the graphics asset identified by the corresponding identifier, wherein the virtual GPU executes graphics instructions on behalf of the application, and wherein the corresponding identifier is associated with the graphics instructions; and determining, based at least in part on the indicators of one or more access restrictions of the graphics asset, that the virtual GPU is approved to access the graphics asset; and responsive to the determination: obtaining the graphics asset from the graphics asset repository; and returning the graphics asset associated with the one or more corresponding identifiers to the virtual GPU.

13. The non-transitory computer-readable storage medium as recited in claim 12, wherein the one or more access restrictions or a particular graphics asset indicate global access, access only by a particular account or organization, or access only by a particular application.

14. The non-transitory computer-readable storage medium as recited in claim 12, wherein the program instructions are further computer-executable to perform: receiving a query indicative of an identifier pool in the graphics asset repository; determining access to the identifier pool in the query; and returning, from the asset management service, data indicative of one or more graphics assets in the identifier pool in the query.

15. The non-transitory computer-readable storage medium as recited in claim 12, wherein the graphics asset is pre-fetched by the virtual GPU from the graphics asset repository prior to receipt by the virtual GPU of one or more graphics instructions associated with the identifier of the graphics asset.

16. The non-transitory computer-readable storage medium as recited in claim 12, wherein the program instructions are further computer-executable to perform: executing an application on a virtual compute instance, wherein the application comprises the identifier corresponding to the graphics asset, and wherein executing the application comprises sending the one or more graphics instructions and the identifier from the virtual compute instance to the virtual GPU.

17. The non-transitory computer-readable storage medium as recited in claim 12, wherein the one or more identifiers comprise one or more handles or one or more secure hashes.

18. The non-transitory computer-readable storage medium as recited in claim 12, wherein the graphics asset is replaced in the graphics asset repository with a modified graphics asset, and wherein the identifier of the graphics asset is usable to retrieve the modified graphics asset.

* * * * *